United States Patent
Jarvenpaa et al.

(10) Patent No.: US 10,768,422 B2
(45) Date of Patent: Sep. 8, 2020

(54) SINGLE LIGHT SOURCE NEAR EYE DISPLAY

(71) Applicant: Nokia Technologies Oy, Espoo (FI)

(72) Inventors: Toni Jarvenpaa, Toijala (FI); Jan Eskolin, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/748,706

(22) PCT Filed: Aug. 8, 2016

(86) PCT No.: PCT/FI2016/050553
§ 371 (c)(1),
(2) Date: Jan. 30, 2018

(87) PCT Pub. No.: WO2017/029432
PCT Pub. Date: Feb. 23, 2017

(65) Prior Publication Data
US 2019/0011704 A1    Jan. 10, 2019

(30) Foreign Application Priority Data
Aug. 18, 2015  (EP) ..................................... 15181320

(51) Int. Cl.
*G02B 27/14*  (2006.01)
*G03H 1/00*   (2006.01)
(Continued)

(52) U.S. Cl.
CPC ....... *G02B 27/0172* (2013.01); *G02B 27/283* (2013.01); *G02B 2027/015* (2013.01);
(Continued)

(58) Field of Classification Search
CPC ....... A61B 3/032; A61B 3/103; A61B 3/1015; A61B 3/14; A61B 3/113; A61B 3/1208; A61B 3/1225; A61B 3/024; G06F 1/163; G06F 3/011; G06F 3/012; G06F 3/013; G06F 3/017; G06F 3/03545; G02B 2027/0187; G02B 27/0172; G02B 27/0025; G02B 27/0093; G02B 27/0176;
(Continued)

(56) References Cited

U.S. PATENT DOCUMENTS

| 2001/0055152 | A1 | 12/2001 | Richards ..................... 359/462 |
| 2009/0027772 | A1* | 1/2009 | Robinson ............. H04N 13/344 359/472 |

(Continued)

FOREIGN PATENT DOCUMENTS

| EP | 1647963 A1 | 4/2006 |
| EP | 2378347 A1 | 10/2011 |
| JP | S63168622 A | 7/1988 |

*Primary Examiner* — Dawayne Pinkney
(74) *Attorney, Agent, or Firm* — Harrington & Smith

(57) ABSTRACT

An apparatus including a light source, a first display, a first polarizing beam splitter having a first light input surface, a first light input transmission surface, a first display interface surface, and a first display projection surface, a second display, a second polarizing beam splitter having a second light input surface, a second display interface surface, and a second display projection surface, and a retarder that is positioned between the first light input transmission surface and the second light input surface is disclosed.

10 Claims, 14 Drawing Sheets

(51) Int. Cl.
*G02B 27/22* (2018.01)
*G02B 27/12* (2006.01)
*H04N 7/00* (2011.01)
*G09G 5/00* (2006.01)
*G02F 1/1335* (2006.01)
*G02B 27/01* (2006.01)
*G02B 27/28* (2006.01)

(52) U.S. Cl.
CPC ............... *G02B 2027/0132* (2013.01); *G02B 2027/0143* (2013.01); *G02B 2027/0178* (2013.01)

(58) Field of Classification Search
CPC .............. G02B 27/0126; G02B 27/283; G02B 2027/011; G02B 2027/015; G02B 2027/0178
USPC ........ 359/630–636, 409–410, 462, 466, 639, 359/626, 13–14, 404, 407; 351/243, 200, 351/239, 246, 205–206, 210–211, 218, 351/220–223; 348/115; 345/7, 9, 156; 349/11; 310/49 R, 156.35, 266–268, 310/156.02; 340/438, 980, 995.1, 815.47, 340/815.74
See application file for complete search history.

(56) References Cited

U.S. PATENT DOCUMENTS

2010/0171890 A1   7/2010  Furukawa et al. ................. 349/9
2013/0021658 A1   1/2013  Miao et al. ................... 359/256

* cited by examiner

SINGLE LIGHT SOURCE NEAR EYE DISPLAY

TECHNICAL FIELD

The present application relates generally to a single light source near eye display.

BACKGROUND

As electronic apparatuses become increasing prevalent in our society, users of such electronic apparatuses utilize their electronic apparatuses in almost every aspect of the users' lives, from communication, to navigation, to scheduling. As such, it may be desirable to configure an apparatus such that the apparatus may operate in an efficient manner.

SUMMARY

Various aspects of example embodiments are set out in the summary, the drawings, the detailed description, and the claims.

One or more example embodiments may provide an apparatus, a computer readable medium, a non-transitory computer readable medium, a computer program product, and/or a method for generating an input light beam, splitting the input light beam into a first light beam that has a first polarization and a second light beam that has a second polarization, changing the first light beam from the first polarization to the second polarization, reflecting the first light beam towards a second display, reflecting the first light beam such that the first light beam represents information that is displayed on a second display, and reflecting the second light beam such that the second light beam represents information that is displayed on a first display.

One or more example embodiments may provide an apparatus, a computer readable medium, a computer program product, and/or a non-transitory computer readable medium having means for generating an input light beam, means for splitting the input light beam into a first light beam that has a first polarization and a second light beam that has a second polarization, means for changing the first light beam from the first polarization to the second polarization, means for reflecting the first light beam towards a second display, means for reflecting the first light beam such that the first light beam represents information that is displayed on a second display, and means for reflecting the second light beam such that the second light beam represents information that is displayed on a first display.

An apparatus comprising a light source, a first display, a first polarizing beam splitter having a first light input surface that is oriented to receive light from the light source, a first light input transmission surface that is oriented to transmit light received at the first light input surface that has a first polarization, a first display interface surface that is oriented to transmit light received at the first light input surface that has a second polarization and to receive light from the first display, and a first display projection surface that is oriented to transmit the light received at the first display interface surface, a second display, and a second polarizing beam splitter having a second light input surface that is oriented to receive light from the first light input transmission surface, a second display interface surface that is oriented to transmit light received at the second light input surface that has the second polarization and to receive light from the second display, and a second display projection surface that is oriented to transmit the light received at the second display interface surface.

One or more example embodiments further comprise a retarder that is positioned between the first light input transmission surface and the second light input surface.

One or more example embodiments further comprise at least one light source optical element that is positioned between the light source and the first light input surface.

One or more example embodiments further comprise at least one relay optical element that is positioned between the first light input transmission surface and the second light input surface.

In at least one example embodiment, the relay optical element is positioned between the first light input transmission surface and the retarder.

In at least one example embodiment, the relay optical element is positioned between the retarder and the second light input surface.

In at least one example embodiment, the retarder is a lambda-over-two retarder.

In at least one example embodiment, the lambda-over-two retarder is configured to receive light having the first polarization and to transmit light having the second polarization.

In at least one example embodiment, the lambda-over-two retarder is configured to receive light having the first polarization from the first light input transmission surface and to transmit light having the second polarization toward the second light input surface.

In at least one example embodiment, the first polarization is p-polarization and the second polarization is s-polarization.

In at least one example embodiment, the first polarization is orthogonal to the second polarization.

In at least one example embodiment, the first display is separate from the second display.

In at least one example embodiment, the first display and the second display are non-overlapping subparts of a single display.

In at least one example embodiment, the first display is a liquid crystal on silicon display, and the second display is a liquid crystal on silicon display.

One or more example embodiments further comprise a first light guide that is oriented to receive light from the first display projection surface, and a second light guide that is oriented to receive light from the second display projection surface.

In at least one example embodiment, the first light guide is a first exit pupil expander light guide, and the second light guide is a second exit pupil expander light guide.

In at least one example embodiment, the first light guide is configured to direct the first light beam towards a first eye of a viewer, and the second light guide is configured to direct the second light beam towards a second eye of the viewer.

One or more example embodiments further comprise a first tilting prism that is oriented to receive light from the first display projection surface and transmit light to the first light guide, and a second tilting prism that is oriented to receive light from the second display projection surface and transmit light to the second light guide.

One or more example embodiments further comprise a first projection optical element that is positioned between the first display projection surface and the first tilting prism, and a second projection optical element that is positioned between the second display projection surface and the second tilting prism.

In at least one example embodiment, the apparatus is a see through display.

In at least one example embodiment, the apparatus is a near eye display.

In at least one example embodiment, the apparatus is a head mounted display.

One or more example embodiments further performs focusing the input light beam, by way of at least one light source optical element, prior to the splitting of the input light beam.

One or more example embodiments further performs focusing the first light beam, by way of at least one relay optical element, prior to the changing the first light beam from the first polarization to the second polarization.

One or more example embodiments further performs directing the first light beam, by way of a first light guide, towards an eye of a viewer, and directing the second light beam, by way of a second light guide, towards another eye of the viewer.

In at least one example embodiment, the splitting of the input light beam comprises reflecting the second light beam, by way of the first polarizing beam splitter, towards the first display, and transmitting the first light beam by way of the first polarization beam splitter.

BRIEF DESCRIPTION OF THE DRAWINGS

For a more complete understanding of one or more example embodiments, reference is now made to the following descriptions taken in connection with the accompanying drawings in which.

DETAILED DESCRIPTION OF THE DRAWINGS

Figure 1:
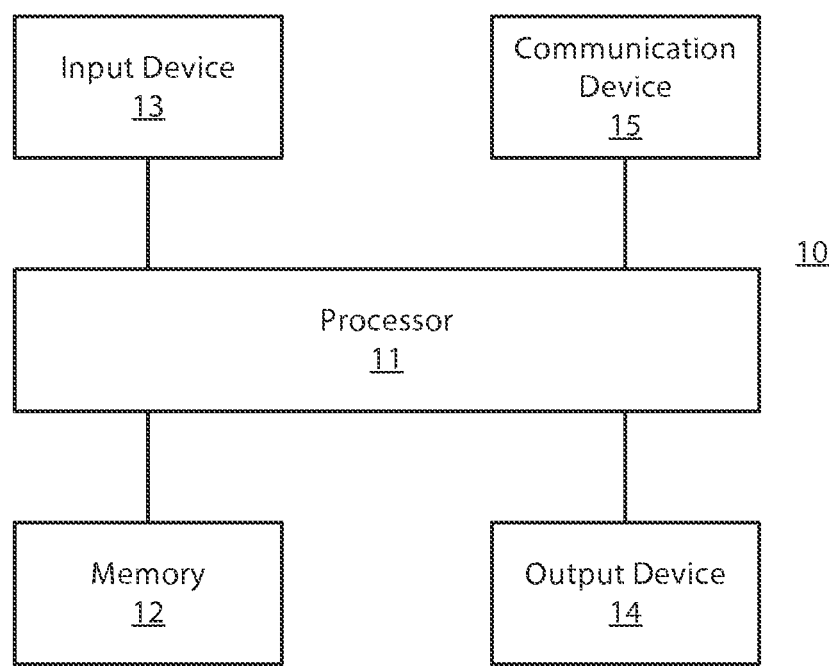
FIG. 1 is a block diagram showing an apparatus according to at least one example embodiment.

Various example embodiments and some of their potential advantages are understood by referring to FIGS. 1 through 9 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from one or more example embodiments and, therefore, should not be taken to limit the scope of the claims. While electronic apparatus 10 is illustrated and will be hereinafter described for purposes of example, other types of electronic apparatuses may readily employ one or more example embodiments. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, a near eye display, a head mounted display, a wearable apparatus, a see through display, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ one or more example embodiments regardless of any intent to provide mobility. In this regard, even though some example embodiments may be described in conjunction with mobile applications, it should be understood that such example embodiments may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises at least one processor, such as processor 11 and at least one memory, such as memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types (e.g., one or more standards in the Institute of Electrical and Electronics Engineers (IEEE) 802 family of wired and wireless standards). By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing one or more example embodiments including, for example, one or more of the functions described herein. For example, processor 11 may comprise means, such as a digital signal processor device, a microprocessor device, an analog to digital converter, a digital to analog converter, processing circuitry and other circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 11 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus, and/or the like. For example, the apparatus may send the information to a separate display, to a computer, to a laptop, to a mobile apparatus, and/or the like. For example, the apparatus may be a server that causes display of the information by way of sending the information to a client apparatus that displays the information. In this manner, causation of display of the information may comprise sending one or more messages to the separate apparatus that comprise the information, streaming the information to the separate apparatus, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In example embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element that is separate from processor 11 for processing data, such as image data. The camera module may provide data, such as image data, in one or more of various formats. In at least one example embodiment, the camera module comprises an encoder, a decoder, and/or the like for compressing and/or decompressing image data. The encoder and/or decoder may encode and/or decode according to a standard format, for example, a Joint Photographic Experts Group (JPEG) standard format.

Figure 2:
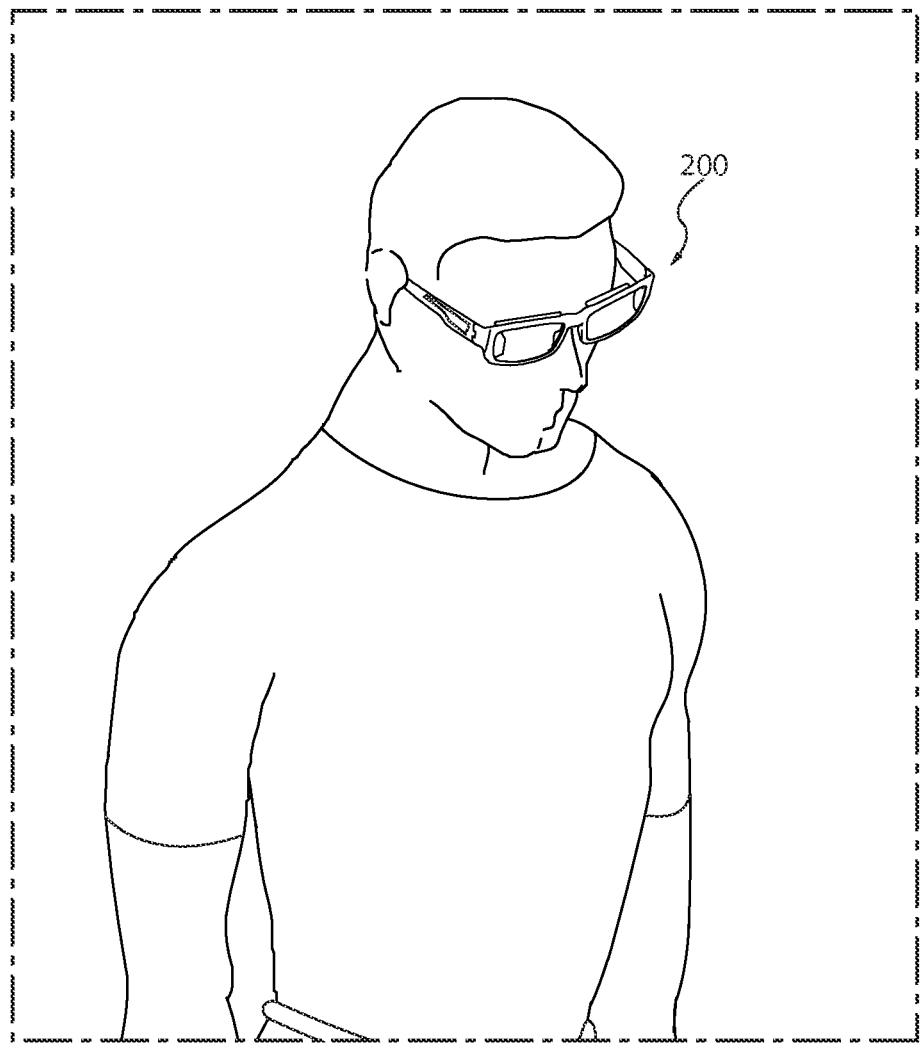
FIG. 2 is a diagram illustrating a near eye display according to at least one example embodiment.

FIG. 2 is a diagram illustrating a near eye display according to at least one example embodiment. The example of FIG. 2 is merely an example and does not limit the scope of the claims. For example, near eye display configuration may vary, near eye display form factor may vary, near eye display near eye display appearance may vary, and/or the like.

In many circumstances, a user may desire to interact with an electronic device. In such circumstances, it may often be desirable for the user to interact with an electronic apparatus by way of a near eye display. For example, the user may interact with a program interaction screen associated with a program, read the text of a webpage, and/or the like. In some circumstances, it may be desirable for a near eye display to be a see through display, a head mounted display, and/or the like. In at least one example embodiment, a see through display is a display that presents information to a user, but through which objects on an opposite side of the display from the user may be seen. A see through display may be comprised by a window, a windshield, a visor, glasses, and/or the like. A head mounted display may, for example, be a display that is head mountable, a display that is coupled to an element that is wearable at a location on and/or proximate to the head of a user, a display that is wearable at a location on and/or proximate to the head of a user, and/or the like. In at least one example embodiment, a head mounted display is a see through head mounted display.

In many circumstances, a near eye display may be designed such that the near eye display is in a small form factor, unobtrusive, fashionable, etc. In many circumstances, the battery capacity of the batteries powering the near eye display may be limited due to sizing constraints associated with the housing of such a near eye display, due to weight limitations, due to design constraints, and/or the like. As such, in some circumstances, it may be desirable to manage the consumption of the limited battery capacity, and to efficiently conserve such battery capacity.

FIG. 2 is a diagram illustrating a near eye display according to at least one example embodiment. The example of FIG. 2 depicts a viewer wearing near eye display 200 that comprises two see through displays, oriented such that one of the see through displays corresponds with one of the viewer's eyes, and the other see through display corresponds with the other of the viewer's eyes. Although the example of FIG. 2 depicts near eye display 200 as having a form factor similar to a pair of glasses, a near eye display may have any type of form factor, may comprise any number of see through displays, etc., and/or the like. For example, a near eye display may be a monocular near eye display that comprises a single near eye display, see through display, etc., a binocular near eye display that comprises two near eye displays, see through displays, etc., and/or the like. As can be seen in the example of FIG. 2, the viewer is peering through the see through displays of near eye display 200. In this manner, the viewer may perceive information that is displayed by way of each of the see through displays of near eye display 200. For example, a see through display may direct light into one of the viewer's retinas such that the viewer perceives a virtual image projected by the see through display, may project light onto a see through display such that the user perceives a real image displayed on the see through display, and/or the like.

Figure 3A:
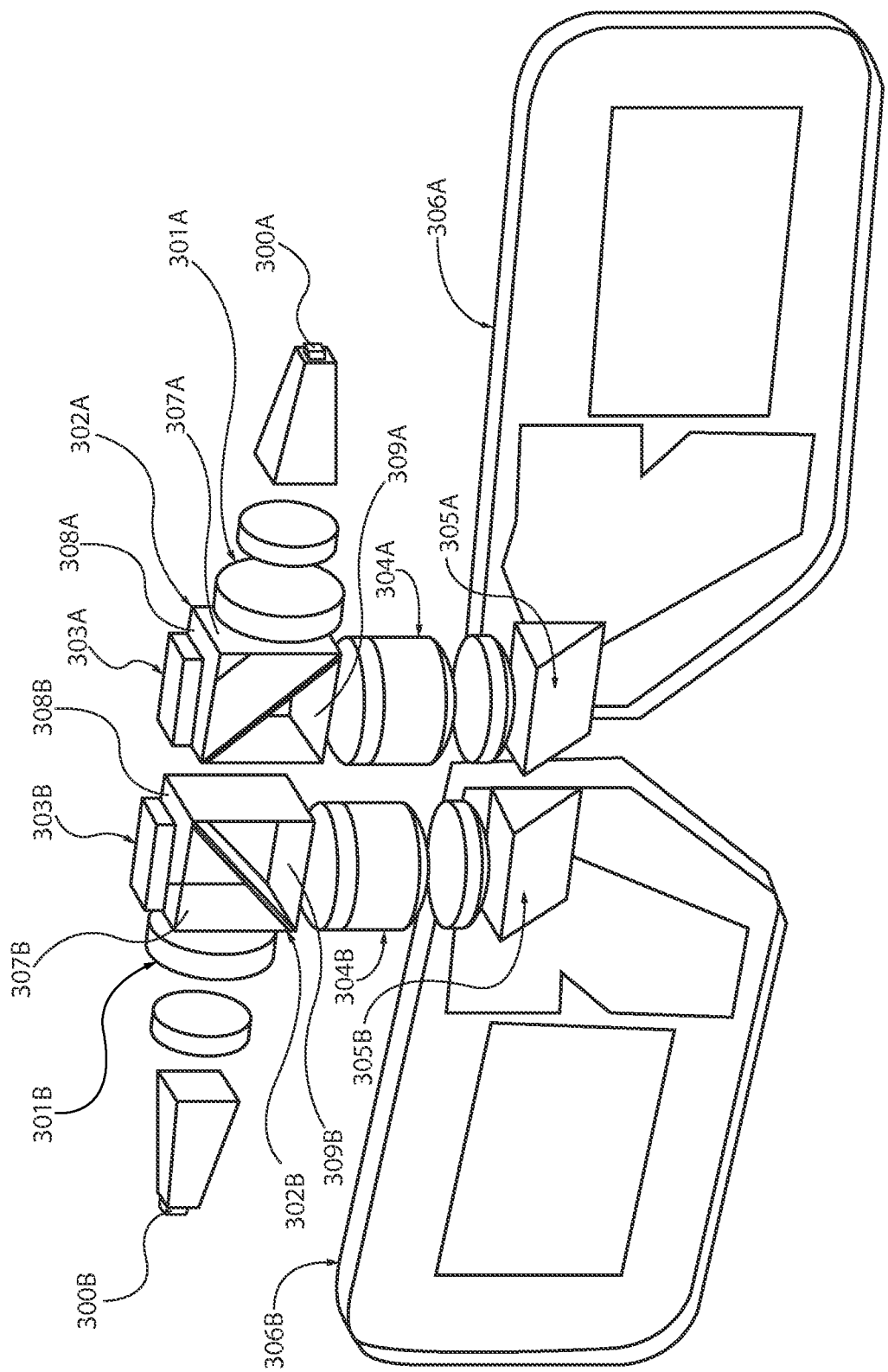
FIGS. 3A-3C are diagrams illustrating a near eye display having dual light sources according to at least one example embodiment.
Figure 3B:
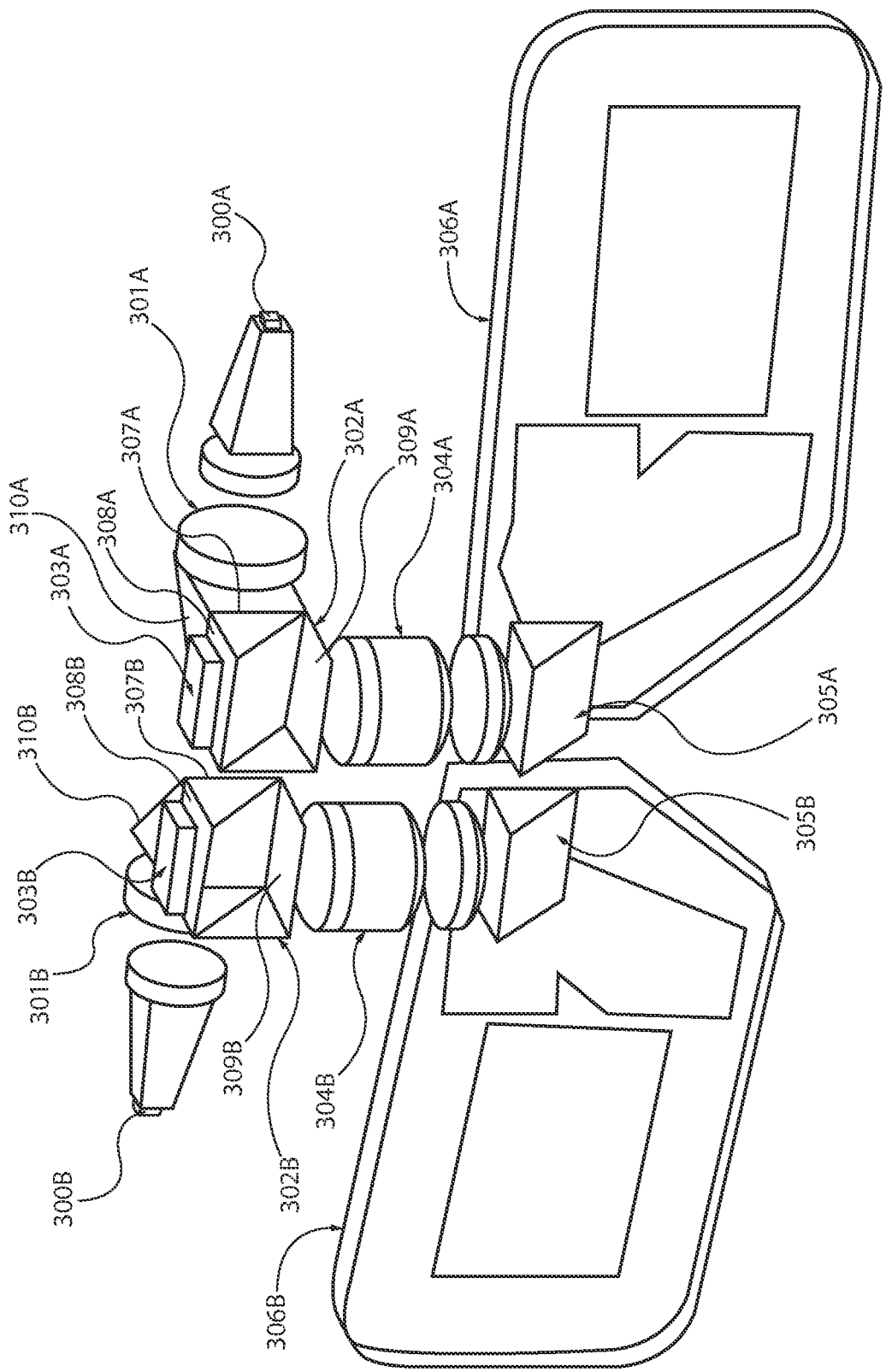
Figure 3C:
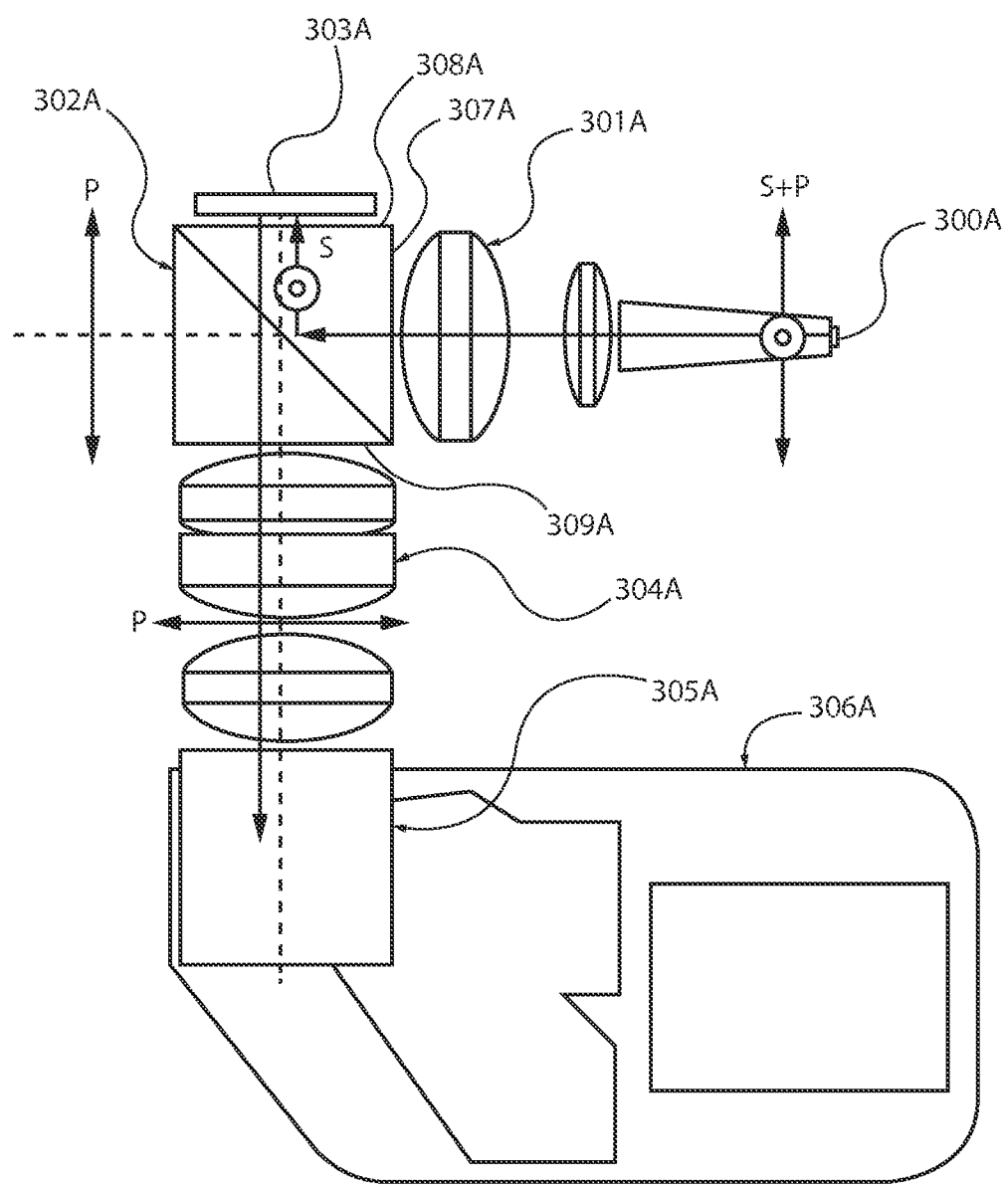

FIGS. 3A-3C are diagrams illustrating a near eye display having dual light sources according to at least one example embodiment. The examples of FIGS. 3A-3C are merely examples and do not limit the scope of the claims. For example, the configuration of the near eye display may vary, the appearance of the near eye display may vary, the size, placement, etc. of the various optical elements may vary, and/or the like.

In many circumstances, a near eye display utilizes a separate light source for each see through display comprised by the near eye display. A light source may be a device that is utilized for generation of light, a beam of light, etc. In at least one example embodiment, a single light source comprises one or more light emitting elements, such as light emitting diodes (LEDs), red-green-blue light emitting diodes (RGB LEDs), organic light emitting diodes (OLEDs), and/or the like. For example, a monocular near eye display may comprise a single light source, a binocular near eye display may comprise two light sources, and/or the like. In at least one example embodiment, an apparatus comprises a light source. The apparatus may, for example, generate an input light beam by way of the light source, actuate the light source in order to facilitate rendering of information by way of the near eye display, and/or the like. As stated previously, in some circumstances, an apparatus comprises more than one light source. In at least one example embodiment, an apparatus comprises a first light source and a second light source. In this manner, the apparatus may generate a first input light beam by way of the first light source, and generate a second input light beam by way of the second light source.

FIG. 3A is a diagram illustrating a near eye display having dual light sources according to at least one example embodiment. As can be seen, the near eye display depicted in the example of FIG. 3A comprises two light sources, light source 300A and light source 300B. As can be seen, the near eye display is a binocular near eye display that comprises two discrete see through displays. In this manner, light source 300A is utilized in association with one of the see through displays, and light source 300B is utilized in association with another of the see through displays.

In the example of FIG. 3A, the near eye display comprises two polarizing beam splitters, polarizing beam splitter 302A and polarizing beam splitter 302B. Polarizing beam splitter 302A may be characterized as having light input surface 307A, display interface surface 308A, and display projection surface 309A. As can be seen, polarizing beam splitter 302A receives an input light beam from light source 300A at light input surface 307A. As can be seen, display 303A is positioned proximate to display interface surface 308A, is coupled to polarizing beam splitter 302A at display interface surface 308A, and/or the like. Polarizing beam splitter 302B may be characterized as having light input surface 307B, display interface surface 308B, and display projection surface 309B. As can be seen, polarizing beam splitter 302B receives an input light beam from light source 300B at light input surface 307B. As can be seen, display 303B is positioned proximate to display interface surface 308B, is coupled to polarizing beam splitter 302B at display interface surface 308B, and/or the like. As can be seen, display projection surface 309A is opposite from the display interface surface 308A, display interface surface 308A is orthogonal to light input surface 307A, display projection surface 309A is orthogonal to light input surface 307A, and/or the like.

In at least one example embodiment, a near eye display utilizes one or more polarizing beam splitters to facilitate direction of an input light beam towards a display, to facilitate transmission of a light beam that represents information displayed on a display comprised by the near eye display, and/or the like. In at least one example embodiment, a polarizing beam splitter has a light input surface that is oriented to receive light from the light source. In this manner, the light source may generate an input light beam that is directed towards the polarizing beam splitter. The polarizing beam splitter may be configured to receive an input light beam at a light input surface of the polarizing beam splitter, and to split the input light beam. For example, as shown in FIG. 3A, polarizing beam splitter 302A may receive an input light beam from light source 300A at light input surface 307A and split the input light beam. In such an example, the splitting of the input light beam may comprise reflecting a portion of the input light beam having a first polarization, and transmitting a portion of the input light beam having a second polarization. In this manner, the polarizing beam splitter may split the input light beam into a first light beam having a first polarization, and a second light beam having a second polarization. For example, the first polarization may be p-polarization and the second polarization may be s-polarization, the first polarization may be s-polarization and the second polarization may be p-polarization, and/or the like. In some circumstances, the first polarization may be orthogonal to the second polarization.

In many circumstances, a near eye display may utilize one or more displays to facilitate rendering of information such that a viewer, or wearer, of the near eye display may perceive the information. For example, the near eye display may comprise a display associated with each eye, associated with each see through display of a binocular near eye display, and/or the like. The display may be a liquid crystal on silicon (LCoS) display, a micromirror display, such as a digital light projection (DLP) display, a microdisplay, and/or the like. In at least one example embodiment, the display fails to comprise a light source. In this manner, the display may require external illumination to convey information that is displayed on the display. For example, as can be seen in FIG. 3A, the near eye display comprises display 303A coupled to display interface surface 308A of polarizing beam splitter 302A. In at least one example embodiment, a polarizing beam splitter has a display interface surface that is oriented to transmit light received at the light input surface that has a specific polarization and to receive light reflected from a display. For example, a polarizing beam splitter may reflect a portion of the input light beam having a first polarization towards the display, and may allow another portion of the input light beam having a second polarization to pass through the polarizing beam splitter without being reflected. The display may be coupled to the polarizing beam splitter at the display interface surface, proximate to the display interface surface, parallel with the display interface surface, and/or the like. For example, in FIG. 3A, polarizing beam splitter 302A may split an input light beam generated by light source 300A such that a light beam is reflected through display interface surface 308A toward display 303A. In such an example, display 303A may reflect a portion of the light beam back through display interface surface 308A toward light guide 306A.

In at least one example embodiment, a polarizing beam splitter has a display projection surface that is oriented to transmit the light received at the display interface surface. In this manner, the display projection surface may transmit the light reflected from the display towards one or more components that facilitate projection of the information represented by the light beam after reflecting off of the display. For example, a portion of an input light beam having a specific polarization may be reflected by a polarizing beam splitter towards a display. The display may be actuated such that the display selectively reflects at least a portion of the reflected portion of the input light beam back towards the display interface surface of the polarizing beam splitter. In such an example, actuation of the display may comprise selectively moving one or more mirror elements of the display, selectively controlling one or more cells of the display, and/or the like. Such actuation of the display may cause the display to be configured such that light reflected from the display represents information that is displayed on the display. The display may be configured to change the polarization of the portion of light reflected by the display such that the reflected light is transmitted through the polarizing beam splitter, towards the display projection surface of the polarizing beam splitter, without being reflected in a different direction.

For example, a portion of the input light beam having a first polarization may be directed towards a polarizing beam splitter that reflects light having a first polarization and transmits light having a second polarization. For example, as depicted in FIG. 3A, polarizing beam splitter 302A may receive an input light beam from light source 300A and split the input light beam into a first light beam having an s-polarization and a second light beam having a p-polarization. In such an example, the portion of the input light beam having the first polarization may be reflected such that the polarizing beam splitter directs the portion of the input light beam having the first polarization towards a display located at the display interface surface of the polarizing beam splitter. For example, as depicted in FIG. 3A, polarizing beam splitter 302A may reflect the first light beam having an s-polarization through display interface surface 308A toward display 303A. The display may be actuated such that the display selectively changes the polarization of at least some of the portion of the input light beam from the first polarization to the second polarization. In this manner, the portion of the input light beam reflected by the display may have the second polarization and, thus, be transmitted through the polarizing beam splitter that is configured to reflect light having the first polarization and transmit light having the second polarization. For example, as depicted in FIG. 3A, display 303A may selectively reflect a portion of the first light beam having an s-polarization such that the polarization of the portion of the first light beam is changed to a p-polarization. In such an example, since polarizing beam splitter 302A is configured to transmit light having a p-polarization, the portion of the first light beam reflected by display 303A that now has the p-polarization is transmitted through polarizing beam splitter 302A toward light guide 306A. In this manner, the portion of the input light beam that represents information displayed on the display is directed through the polarizing beam splitter, towards further components of the near eye display that facilitate presentation of such information to a viewer of the near eye display.

In some circumstances, an input light beam from a light source may fail to be sufficiently focused, aligned, sized, oriented, and/or the like. In such circumstances, it may be desirable to pass the input light beam through one or more optical elements, such as a film, a lens, a membrane, a screen, and/or the like, positioned between the light source and another component of a near eye display, such as a polarizing beam splitter, a tilting prism, and/or the like. In at least one example embodiment, an apparatus comprises at least one light source optical element that is positioned between the light source and the first light input surface. For example, the apparatus may focus, align, manipulate, change, etc. the input light beam, by way of the at least one light source optical element. For example, the light source optical element may shape a radiation pattern of the input light beam, change a color aberration of the input light beam, modify an emission cone directional characteristic of the input light beam, and/or the like.

In the example of FIG. 3A, the near eye display comprises light source optical element 301A, positioned between light source 300A and polarizing beam splitter 302A, and light source optical element 301B, positioned between light source 300B and polarizing beam splitter 302B. As can be seen, an input light beam generated by light source 300A is directed through light source optical element 301A towards light input surface 307A of polarizing beam splitter 302A. In this manner, light source optical element 301A may focus, change, align, reorient, filter, and/or the like the input light beam from light source 300A. Similarly, an input light beam generated by light source 300B is directed through light source optical element 301B towards light input surface 307B of polarizing beam splitter 302B. In this manner, light source optical element 301B may focus, change, align, reorient, filter, and/or the like the input light beam from light source 300B. Although the example of FIG. 3A depicts two light source optical elements per light source, the near eye display may comprise any number of light source optical elements. In some circumstances, the light source optical element may be an interface between two discrete optical elements, an optical fusion between a light source and a polarizing beam splitter, and/or the like.

In order to facilitate the presentation of information such that the information is perceivable by a viewer of a near eye display, it may be desirable to utilize one or more light guides that channel a light beam towards an eye of the viewer. In at least one example embodiment, an apparatus comprises a light guide that is oriented to receive light from a display projection surface of a polarizing beam splitter. For example, the near eye display may be a binocular near eye display, and may comprise a first light guide that is oriented to receive light from the display projection surface of a first polarizing beam splitter, and a second light guide that is oriented to receive light from a display projection surface of a second polarizing beam splitter. In at least one example embodiment, a light guide is an exit pupil expander (EPE) light guide. For example, the exit pupil expander light guide may be a diffractive exit pupil expander that is utilized to facilitate generation of images, presentation of virtual images such that the virtual image is perceivable by a viewer of the near eye display, and/or the like. In at least one example embodiment, the light guide is configured to direct a light beam towards an eye of a viewer. For example, a near eye display may be a binocular near eye display that comprises a first light guide and a second light guide. In such an example, the first light guide may be configured to direct a first light beam towards a first eye of the viewer, and the second light guide may be configured to direct a second light beam towards a second eye of the viewer. In this manner, an apparatus may direct a light beam, by way of a light guide, towards an eye of a viewer.

In the example of FIG. 3A, the near eye display comprises light guide 306A and light guide 306B. As can be seen, light guide 306A is integrated into a lens of the near eye display, and light guide 306B is integrated into another lens of the near eye display. Although the example of FIG. 3A depicts the light guides as being integrated with the lenses of the near eye display, the light guides may be separate from the lenses, may be detachably coupled to the lenses, may be adjacent to the lens, and/or the like. As can be seen in the example of FIG. 3A, light guide 306A may receive light that was reflected from display 303A and transmitted through display projection surface 309A of polarizing beam splitter 302A. Similarly, light guide 306B may receive light that was reflected from display 303B and transmitted through display projection surface 309B of polarizing beam splitter 302B.

In some circumstances, the form factor, design, and/or the like of a near eye display may introduce space constraints, may necessitate particular configurations and/or arrangements of various elements of a near eye display, and/or the like. Further, in some circumstances, it may be desirable to design a near eye display such that the various components comprised by the near eye display are arranged such that the components make an efficient use of the limited space within a housing of a near eye display. In this manner, it may be desirable for the placement of the various components to be flexible. For example, it may be desirable to avoid the placement of one component dictating the particular placement of a different component. For instance, it may be desirable to avoid having the orientation of a polarizing beam splitter dictate the orientation of an input surface of a light guide, a position of a display, and/or the like. In at least one example embodiment, an apparatus comprises a tilting prism that is oriented to receive a light beam from a display projection surface of a polarizing beam splitter, and to transmit the light beam to a light guide. In such an example embodiment, the tilting prism may be a reflecting prism, a 90-degree tilting prism, and/or the like. In this manner, the placement, orientation, etc. of the polarizing beam splitter may be flexible in relation to the placement, orientation, etc. of the light guide.

In the example of FIG. 3A, the near eye display comprises tilting prism 305A and tilting prism 305B. As can be seen in the example of FIG. 3A, tilting prism 305A may receive light that was reflected from display 303A and transmitted through display projection surface 309A of polarizing beam splitter 302A, and reflect the light towards light guide 306A. Similarly, tilting prism 305B may receive light that was reflected from display 303B and transmitted through display projection surface 309B of polarizing beam splitter 302B, and reflect the light towards light guide 306B.

In some circumstances, a light beam reflected by a display and transmitted through a polarizing beam splitter may fail to be sufficiently focused, aligned, sized, oriented, and/or the like for proper projection, for reception by a light guide, and/or the like. In such circumstances, it may be desirable to pass the light beam through one or more optical elements, such as a film, a lens, a membrane, a screen, and/or the like, positioned between the display projection surface of a polarizing beam splitter and another component of a near eye display, such as a tilting prism, a light guide, and/or the like. In at least one example embodiment, an apparatus comprises at least one projection optical element that is positioned between the display projection surface of a polarizing beam splitter and a tilting prism, a light guide, an input surface of a light guide, and/or the like. For example, the apparatus may focus, align, manipulate, change, etc. the light beam, by way of the at least one projection optical element. For example, the projection optical element may focus the light to a certain focus distance, remove parallax, compensate for a perspective error, provide for an adjustable level of magnification, field of view, focal length, etc., set an eye relief, and/or the like. In at least one example embodiment, the projection optical element receives light reflected from a display and produces a virtual image.

In the example of FIG. 3A, the near eye display comprises projection optical element 304A, positioned between display projection surface 309A of polarizing beam splitter 302A and tilting prism 305A, and projection optical element 304B, positioned between display projection surface 309B of polarizing beam splitter 302B and tilting prism 305B. As can be seen, a light beam reflected by display 303A is directed through display projection surface 309A and through projection optical element 304A, towards tilting prism 305A, light guide 306A, and/or the like. In this manner, projection optical element 304A may focus, change, align, reorient, filter, and/or the like the light beam received from display project surface 309A. Similarly, a light beam reflected by display 303B is directed through display projection surface 309B and through projection optical element 304B, towards tilting prism 305B, light guide 306B, and/or the like. In this manner, projection optical element 304B may focus, change, align, reorient, filter, and/or the like the light beam received from display project surface 309B. Although the example of FIG. 3A depicts three projection optical elements per light source, two coupled projection optical elements and a third separate projection optical element, the near eye display may comprise any number of projection optical elements. In some circumstances, the projection optical element may be an interface between two discrete optical elements, an optical fusion between a polarizing beam splitter and a tilting prism, an interface at the coupling of a polarizing beam splitter and a light guide, and/or the like.

In some circumstances, an orientation, position, etc. of a polarizing beam splitter relative to a light source may necessitate the introduction of one or more additional components, optical elements, and/or the like into a near eye display. For example, in order to reduce interference between a polarizing beam splitter and a tilting prism, it may be desirable to align the polarizing beam splitter with the tilting prism. For example, it can be seen in FIG. 3A that polarizing beam splitter 302A fails to be aligned with the direction of tilting prism 305A, and that polarizing beam splitter 302B fails to be aligned with the direction of tilting prism 305B. In this manner, the near eye display depicted in the example of FIG. 3A may suffer from various visual artifacts, warping, interference, and/or the like caused by the lack of alignment between the polarizing beam splitters and the tilting prism.

FIG. 3B is a diagram illustrating a near eye display having dual light sources according to at least one example embodiment. In the example of FIG. 3B, polarizing beam splitters 302A and 302B have been rotated with respect to their orientations in the example of FIG. 3A such that polarizing beam splitters 302A and 302B align with tilting prisms 305A and 305B, respectively. As can be seen, many of the components of the near eye display depicted in the example of FIG. 3B correspond with the components of the near eye display depicted in the example of FIG. 3A. As such, the various components of the example of FIG. 3B may be similar as described regarding the example of FIG. 3A. However, as can be seen, the placement of light source 300A and light source 300B has shifted such that the light sources fail to be in line with polarizing beam splitters 302A and 302B. In this manner, the input light beam generated by light source 300A is directed towards tilting prism 310A, which reflects the input light beam toward light input surface 307A of polarizing beam splitter 302A. As can be seen, the orientation of light input surface 307A in the example of FIG. 3B has rotated in comparison to the orientation of light input surface 307A in the example of FIG. 3A. Similarly, the input light beam generated by light source 300B is directed towards tilting prism 310B, which reflects the input light beam toward light input surface 307B of polarizing beam splitter 302B. As can be seen, the orientation of light input surface 307B in the example of FIG. 3B has rotated in comparison to the orientation of light input surface 307B in the example of FIG. 3A.

As discussed previously, a polarizing beam splitter may be configured such that the polarizing beam splitter reflects a portion of a light beam having a first polarization and transmits a different portion of the light beam having a second polarization. For example, the polarizing beam splitter may be configured to reflect a portion of a light beam having an s-polarization, and transmit a different portion of the light beam having a p-polarization. For example, a light source may generate an input light beam that has both s-polarization and p-polarization components, is circularly polarized, is elliptically polarized, and/or the like. In such an example, a polarizing beam splitter may reflect the portion of the input light beam that is s-polarized towards a display, and may transmit the portion of the input light beam that is p-polarized. In such an example, the transmitted portion of the input light beam that is p-polarized may be absorbed, scattered, otherwise wasted, and/or the like. As such, the near eye display effectively wastes the power required to generate that portion of the input light beam by way of the light source.

FIG. 3C is a diagram illustrating the paths and polarization of various light beams associated with a near eye display having dual light sources according to at least one example embodiment. As can be seen, many of the components of the near eye display depicted in the example of FIG. 3C correspond with the components of the near eye display depicted in the example of FIG. 3A. As such, the various components of the example of FIG. 3C may be similar as described regarding the example of FIG. 3A. As can be seen in the example of FIG. 3C, light source 300A generated an input light beam that has both s-polarization components (indicated by an 'S' and the circle on the path of the light beam) and p-polarization components (indicated by the 'P' and the perpendicular arrow on the path of the light beam). The p- and s-polarized input light beam is directed through light source optical element 301A and light input surface 307A of polarizing beam splitter 302A. In the example of FIG. 3C, polarizing beam splitter 302A is configured to reflect light having an s-polarization, and to transmit light having a p-polarization. As can be seen, the input light beam is split into a first light beam having an s-polarization (indicated by an 'S' and the circle on the path of the first light beam directed towards display 303A) and a second light beam having a p-polarization (indicated by a 'P' and the perpendicular arrow on the path of the second light beam that is directed to the left side of FIG. 3A). As can be seen, the portion of the input light beam that is transmitted through polarizing beam splitter 302A is absorbed, scattered, otherwise wasted, and/or the like. Following the path of the first light beam, the first light beam is reflected towards display 303A through display interface surface 308A. In the example of FIG. 3C, display 303A is configured to display information and selectively reflect a portion of the first light beam, changing the polarization of the reflected portion of the first light beam from an s-polarization to a p-polarization. Thus, the reflected portion of the first light beam having the p-polarization is transmitted through polarizing beam splitter 302A towards various components of the near eye display and light guide 306A. The example of FIG. 3C depicts half of the near eye display depicted in the example of FIG. 3A. The same discussion, including the wasting of the p-polarized portion of the input light beam from light source 300B, is applicable to the other half of the near eye display depicted in the example of FIG. 3A.

FIGS. 4A-4D are diagrams illustrating a near eye display having a single light source according to at least one example embodiment. The examples of FIGS. 4A-4D are merely examples and do not limit the scope of the claims. For example, the configuration of the near eye display may vary, the appearance of the near eye display may vary, the size, placement, etc. of the various optical elements may vary, and/or the like.

As stated previously, in many circumstances, a near eye display may be designed such that the near eye display is in a small form factor, unobtrusive, fashionable, etc. In many circumstances, the battery capacity of the batteries powering the near eye display may be limited due to sizing constraints associated with the housing of such a near eye display, due to weight limitations, due to design constraints, and/or the like. As such, in some circumstances, it may be desirable to manage the consumption of the limited battery capacity, and to efficiently conserve such battery capacity. Specifically, it may be desirable to limit a number of electrical components comprised by the near eye display, to reduce the component count of components that draw a significant amount of power, and/or the like. For example, in many circumstances, a light source of a near eye display may be the primary power draw of the near eye display. For instance, the light source often requires significantly more power to operate than other components of the near eye display. For example, a light source of the near eye display may draw significantly more power than is drawn by a display of the near eye display. As such, in some circumstances, it may be desirable to configure a near eye display such that the near eye display utilizes a single light source, even if the near eye display is a binocular near eye display. For example, the near eye display may be configured such that an input light beam of a single light source may be split, and utilized to convey information displayed on a display to an eye of a viewer and to convey information display on another display to another eye of the viewer. In this manner, the additional power draw of a second light source may be avoided, the form factor of the near eye display may be shrunk as a result of comprising only a single light source, and/or the like. Furthermore, as previously described, utilization of the polarizing beam splitter results in a large portion of the input light beam generated by the light source failing to be directed towards the display. In this manner, the power utilized to generate such light that is not directed towards the display may fail to provide a benefit to the user, an operational benefit, a design benefit, and/or the like. Therefore, it may be further desirable to reduce or avoid generating light that fails to be directed towards a display.

In at least one example embodiment, an apparatus comprises a polarizing beam splitter that is additionally characterized by a light input transmission surface. The light input transmission surface may be a surface that is oriented to transmit light received at a light input surface that has a particular polarization. For example, the polarizing beam splitter may be configured to reflect light having an s-polarization, and to transmit light having a p-polarization. In such an example, an input light beam from a light source may be directed towards a light input surface of the polarizing beam splitter, and the polarizing beam splitter may split the input light beam into a first light beam that has a first polarization and a second light beam that has a second polarization. For example, the polarizing beam splitter may reflect the s-polarized light towards a display, and transmit the p-polarized light towards the light input transmission surface. The s-polarized light may be reflected by the display such that the reflected portion of the light is changed to a p-polarization, and represents information that is displayed on the display.

However, unlike the near eye displays discussed regarding the examples of FIGS. 3A-3C, it may be desirable to utilize the transmitted portion of the input light beam, the p-polarized light beam that is transmitted through the polarizing beam splitter, rather than wasting that portion of the generated input light beam. Utilizing the p-polarized light beam rather than wasting that portion of the input light beam facilitates the efficient utilization of limited battery capacity, prevents unnecessary heat generation, and/or the like. In order to utilize the p-polarized light beam that was transmitted through the light input transmission surface of the polarizing beam splitter, it may be desirable to change the polarization of the light beam from p-polarization to s-polarization prior to passing the light beam through another polarizing beam splitter that is also configured to reflect light having an s-polarization, and to transmit light having a p-polarization. In at least one example embodiment, an apparatus comprises a retarder. Such a retarder may, for example, be positioned between a light input transmission surface of a first polarizing beam splitter and a light input surface of a second polarizing beam splitter. In at least one example embodiment, the retarder is a lambda-over-two ($\lambda/2$, where lambda ($\lambda$) is the wavelength of light) retarder. For example, the lambda-over-two retarder may be configured to receive light having a first polarization and to transmit light having a second polarization. For instance, the lambda-over-two retarder may be configured to receive light having a p-polarization and to transmit light having an s-polarization. For example, the lambda-over-two retarder may receive light having a p-polarization from the light input transmission surface of the first polarizing beam splitter and to transmit light having an s-polarization toward a light input surface of the second polarizing beam splitter. In this manner, the apparatus may change the light beam from the first polarization to the second polarization by way of the retarder.

As discussed previously, a polarizing beam splitter may be configured to reflect light having a p-polarization and to transmit light having an s-polarization, to reflect light having an s-polarization and to transmit light having a p-polarization, and/or the like. As such, the type of retarder, the placement of the retarder relative to a first polarizing beam splitter and a second polarizing beam splitter, and/or the like may vary. For example, a retarder may be positioned at a display projection surface of the second polarizing beam splitter. In another example, one or more light guides, such as exit pupil expanders, may be configured such that the light guide makes inclusion of a retarder unnecessary, such that the light guide manipulates a light beam in a manner similar to a retarder, and/or the like. In this manner, the exact placement of the retarder relative to the first polarizing beam splitter and the second polarizing beam splitter does not limit the scope of the claims.

Figure 4A:
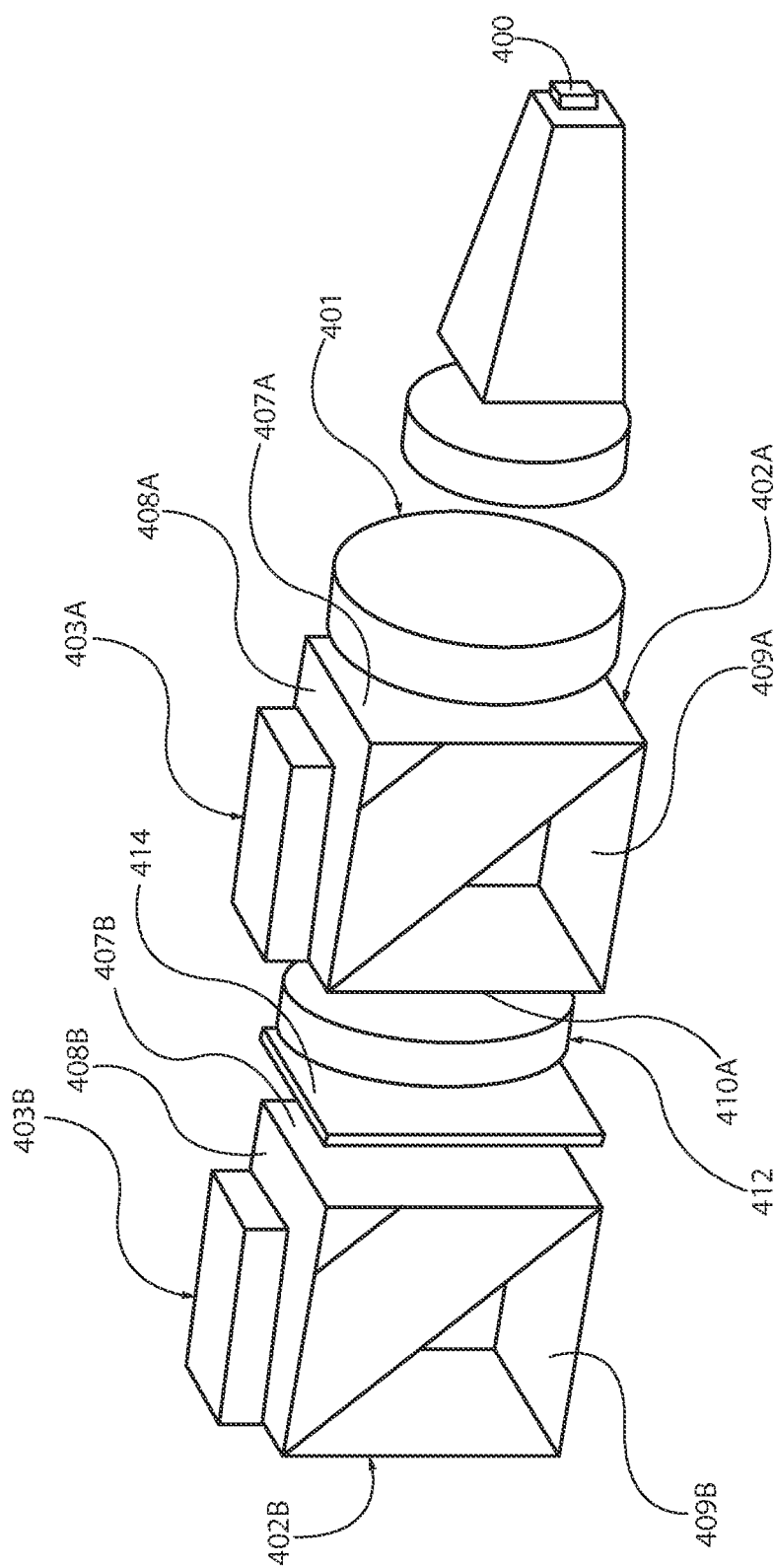
FIGS. 4A-4D are diagrams illustrating a near eye display having a single light source according to at least one example embodiment.

FIG. 4A is a diagram illustrating a portion of a near eye display having a single light source according to at least one example embodiment. The example of FIG. 4A depicts a portion of a near eye display that comprises light source 400, light source optical element 401, polarizing beam splitters 402A and 402B, and displays 403A and 403B. As can be seen, polarizing beam splitter 402A is characterized by light input surface 407A, display interface surface 408A, display projection surface 409A, and light input transmission surface 410A, and polarizing beam splitter 402B is characterized by light input surface 407B, display interface surface 408B, and display projection surface 409B. In the example of FIG. 4A, light source 400 may generate an input light beam having a combination of s- and p-polarization, circular polarization, elliptical polarization, and/or the like, and direct the input light beam towards light input surface 407A of polarizing beam splitter 402A. Polarizing beam splitter 402A may be configured to split the input light beam into a first light beam having s-polarization and a second light beam having p-polarization, such that the first light beam is reflected towards display 403A and the second light beam is transmitted through light input transmission surface 410A of polarizing beam splitter 402A.

In some circumstances, a light beam transmitted through a polarizing beam splitter may fail to be sufficiently focused, aligned, sized, oriented, and/or the like for proper utilization of a retarder. In such circumstances, it may be desirable to pass the light beam through one or more optical elements, such as a film, a lens, a membrane, a screen, and/or the like, positioned between the polarizing beam splitter and another component of a near eye display, such as a retarder. In at least one example embodiment, an apparatus comprises at least one relay optical element that is positioned between a polarizing beam splitter and a retarder, between a light input transmission surface of a polarizing beam splitter and a retarder, and/or the like. For example, the apparatus may focus, align, manipulate, change, etc. the light beam, by way of the at least one relay optical element. In at least one example embodiment, the relay optical element receives light transmitted by a first polarizing beam splitter, modifies the light to be optimal for a particular display, and transmits the light toward a second polarizing beam splitter such that the second polarizing beam splitter reflects at least a portion of the light towards the particular display. For example, a light source optical element may receive an input light beam from a light source and modify one or more optical characteristics of the input light beam to be optimal for reflecting towards a first display such that the portion of the light reflected by the first display properly conveys information that is displayed on the first display. In such an example, a portion of the input light beam may be transmitted through a first polarizing beam splitter towards a relay optical element. The relay optical element may change one or more optical characteristics of the received light to be optimal for reflecting towards a second display such that the portion of light reflected by the second display properly conveys information that is displayed on the second display. In this manner, the light source optical element may modify an input light beam to be optimal for the first display, and the relay optical element may modify a portion of the input light beam to be optimal for the second display.

In the example of FIG. 4A, the near eye display comprises relay optical element 412, positioned between polarizing beam splitter 402A and retarder 414. As can be seen, a portion of the input light beam generated by light source 400 is transmitted through polarizing beam splitter 402A towards light input transmission surface 410A of polarizing beam splitter 402A, towards retarder 414, towards polarizing beam splitter 402B, and/or the like. In this manner, relay optical element 412 may focus, change, align, reorient, filter, and/or the like the light beam that is transmitted through light input transmission surface 410A of polarizing beam splitter 402A. Although the example of FIG. 4A depicts a single relay optical element, the near eye display may comprise any number of relay optical elements. In some circumstances, the relay optical element may be an interface between two discrete optical elements, an optical fusion between a polarizing beam splitter and a retarder, and/or the like.

Rather than utilizing a second light source to provide a second light beam, a near eye display may be configured to utilize a portion of a single input light beam that is generated by a single light source to provide illumination for two displays. In at least one example embodiment, an apparatus comprises another polarizing beam splitter that has a light input surface that is oriented to receive light from a light input transmission surface of a first polarizing beam splitter, a display interface surface that is oriented to transmit light received at the light input surface that has the second polarization and to receive light from a display, and a display projection surface that is oriented to transmit the light received at the display interface surface. In this manner, an apparatus comprising a first polarizing beam splitter, a second polarizing beam splitter, and a retarder may transmit a portion of an input light beam having p-polarization through the first polarizing beam splitter and reflect the portion of the input light beam having s-polarization towards a first display, through the retarder that changes the polarization of the light beam from p-polarization to s-polarization, and towards the second polarizing beam splitter that is configured to reflect s-polarized light towards a second display.

In the example of FIG. 4A, retarder 414 receives a light beam having p-polarization from light input transmission surface 410A of polarizing beam splitter 402A, and transmits a light beam having s-polarization towards light input surface 407B of polarizing beam splitter 402B. In the example of FIG. 4A, polarizing beam splitter 402B may be configured to reflect light having an s-polarization. As such, since the light beam received at light input surface 407B is s-polarized, the substantial majority of the light beam is directed towards display interface surface 408B, display 403B, and/or the like. In this manner, the amount of wasted light, electricity, battery capacity, etc. is reduced in comparison with the near eye displays discussed regarding the examples of FIGS. 3A-3C.

Figure 4B:
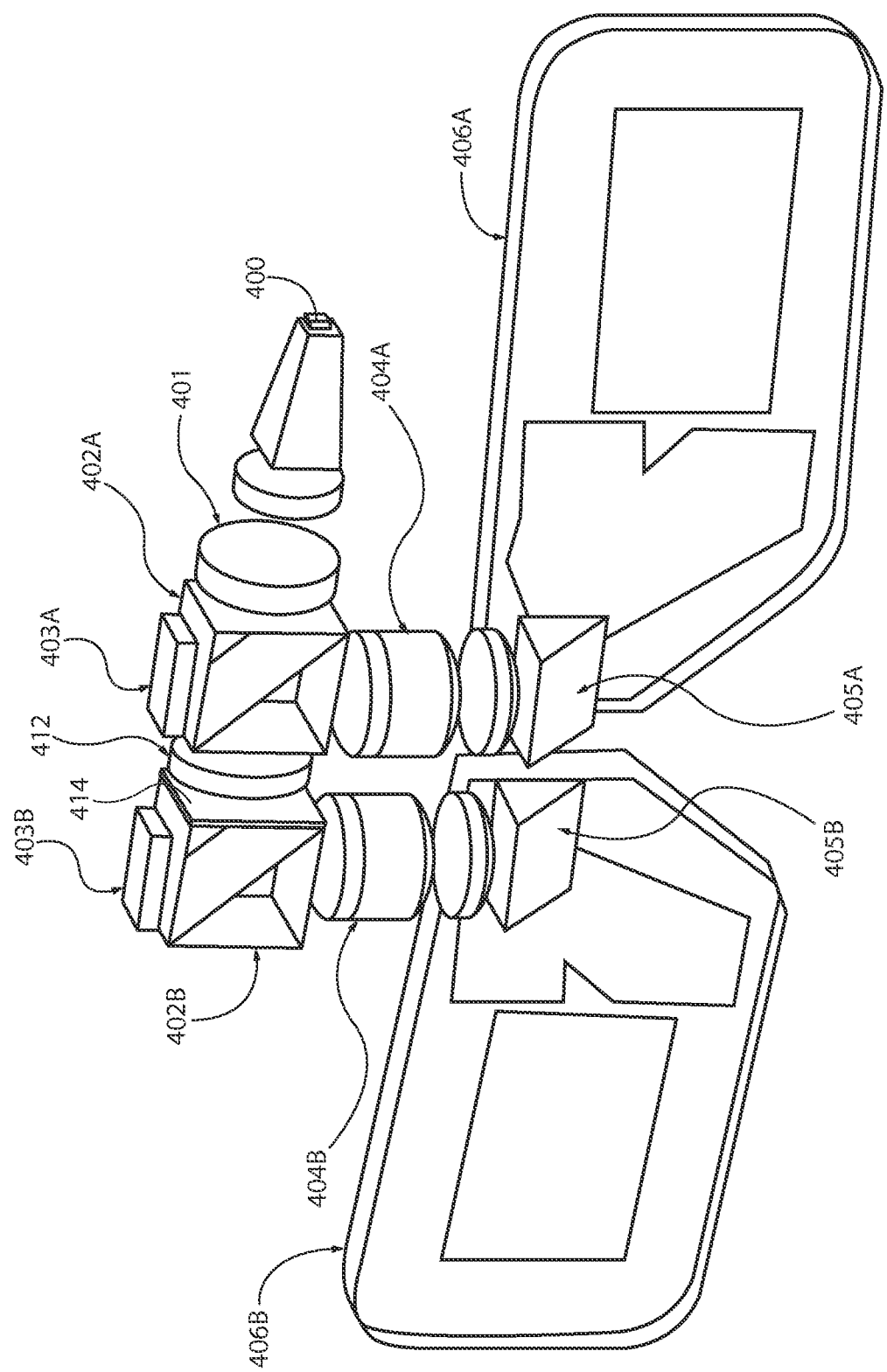

FIG. 4B is a diagram illustrating a near eye display having a single light source according to at least one example embodiment. As can be seen, the upper portion of the near eye display depicted in the example of FIG. 4B corresponds with the portion of the near eye display depicted in the example of FIG. 4A. As such, the various elements depicted in the example of FIG. 4B may be similar as described regarding the example of FIG. 4A. The near eye display of FIG. 4B additionally comprises projection optical elements 404A and 404B, tilting prisms 405A and 405B, and light guides 406A and 406B. The projection optical elements, tilting prisms, and light guides may be similar as described regarding the examples of FIGS. 3A-3C.

In some circumstances, an orientation, position, etc. of a polarizing beam splitter relative to a light source may necessitate the introduction of one or more additional components, optical elements, and/or the like into a near eye display. For example, in order to minimize interference between a polarizing beam splitter and a tilting prism, it may be desirable to align the polarizing beam splitter with the tilting prism. For example, it can be seen in FIG. 4A that polarizing beam splitter 402A fails to be aligned with the direction of tilting prism 405A, and that polarizing beam splitter 402B fails to be aligned with the direction of tilting prism 405B. In this manner, the near eye display depicted in the example of FIG. 4A may suffer from various visual artifacts, warping, interference, and/or the like caused by the lack of alignment between the polarizing beam splitters and the tilting prism.

Figure 4C:
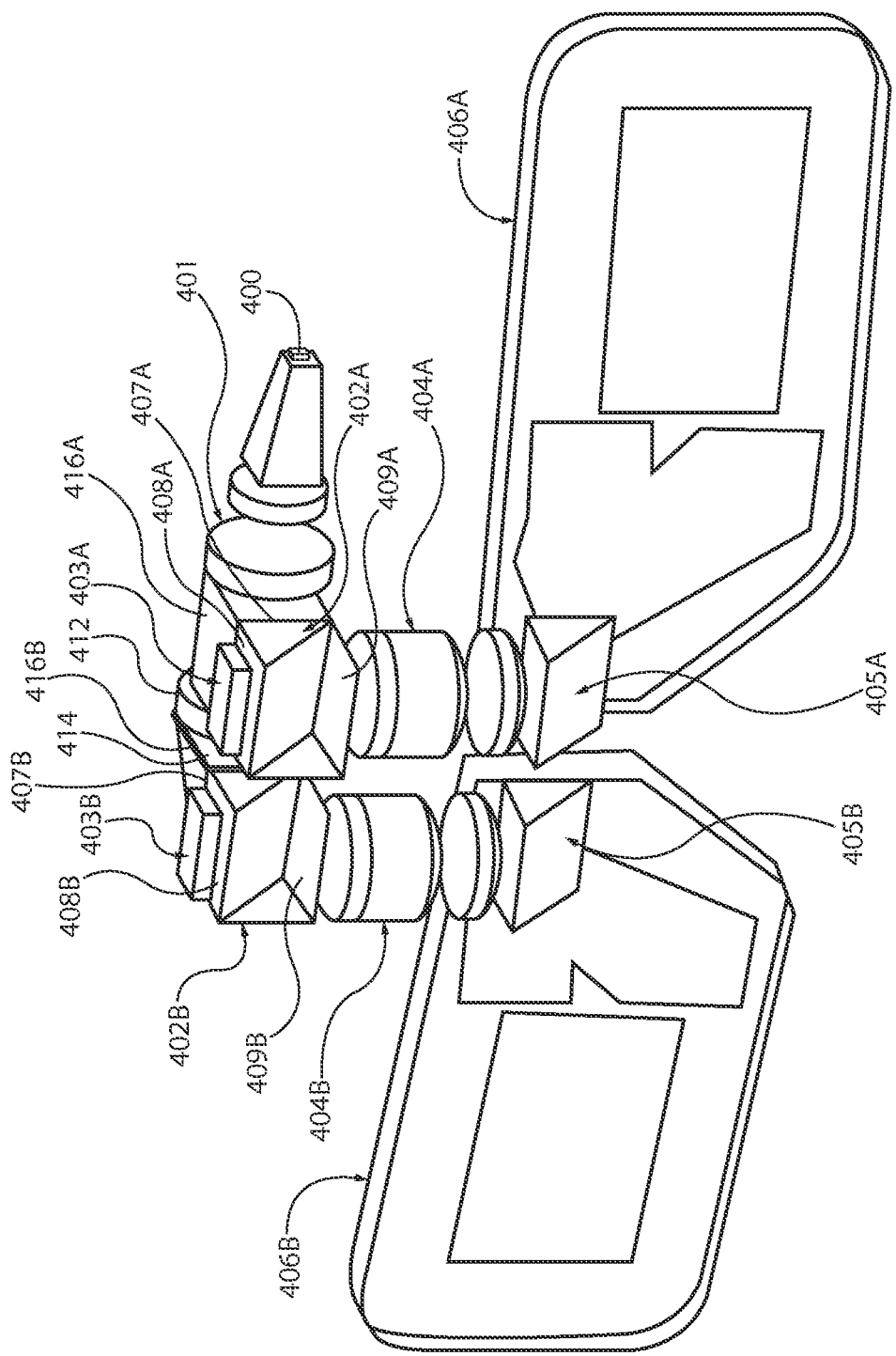

FIG. 4C is a diagram illustrating a near eye display having a single light source according to at least one example embodiment. In the example of FIG. 4C, polarizing beam splitters 402A and 402B have been rotated with respect to their orientations in the example of FIG. 4B such that polarizing beam splitters 402A and 402B align with tilting prisms 405A and 405B, respectively. As can be seen, many of the components of the near eye display depicted in the example of FIG. 4C correspond with the components of the near eye display depicted in the examples of FIG. 4A and FIG. 4B. As such, the various components of the example of FIG. 4C may be similar as described regarding the example of FIG. 4A and FIG. 4B. However, as can be seen, the placement of light source 400 has shifted such that the light source fails to be in line with polarizing beam splitters 402A and 402B. In this manner, the input light beam generated by light source 400 is directed towards polarizing beam splitter 416A, which reflects a portion of the input light beam having s-polarization toward light input surface 407A of polarizing beam splitter 402A, and transmits the portion of the input light beam having p-polarization toward retarder 414, tilting prism 416B, and light input surface 407B of polarizing beam splitter 402B. As can be seen, the orientation of light input surfaces 407A and 407B in the example of FIG. 4C have rotated in comparison to the orientation of light input surfaces 407A and 407B in the examples of FIG. 4A and FIG. 4B.

As discussed previously, a polarizing beam splitter may be configured such that the polarizing beam splitter reflects a portion of a light beam having a first polarization and transmits a different portion of the light beam having a second polarization. For example, the polarizing beam splitter may be configured to reflect a portion of a light beam having an s-polarization, and transmit a different portion of the light beam having a p-polarization. As discussed previously, it may be desirable to configure a near eye display such that the near eye display utilizes the transmitted p-polarized portion of the input light beam, and avoids wasting of the light, wasting of the power required to generate the p-polarized portion of the input light beam, and/or the like.

Figure 4D:
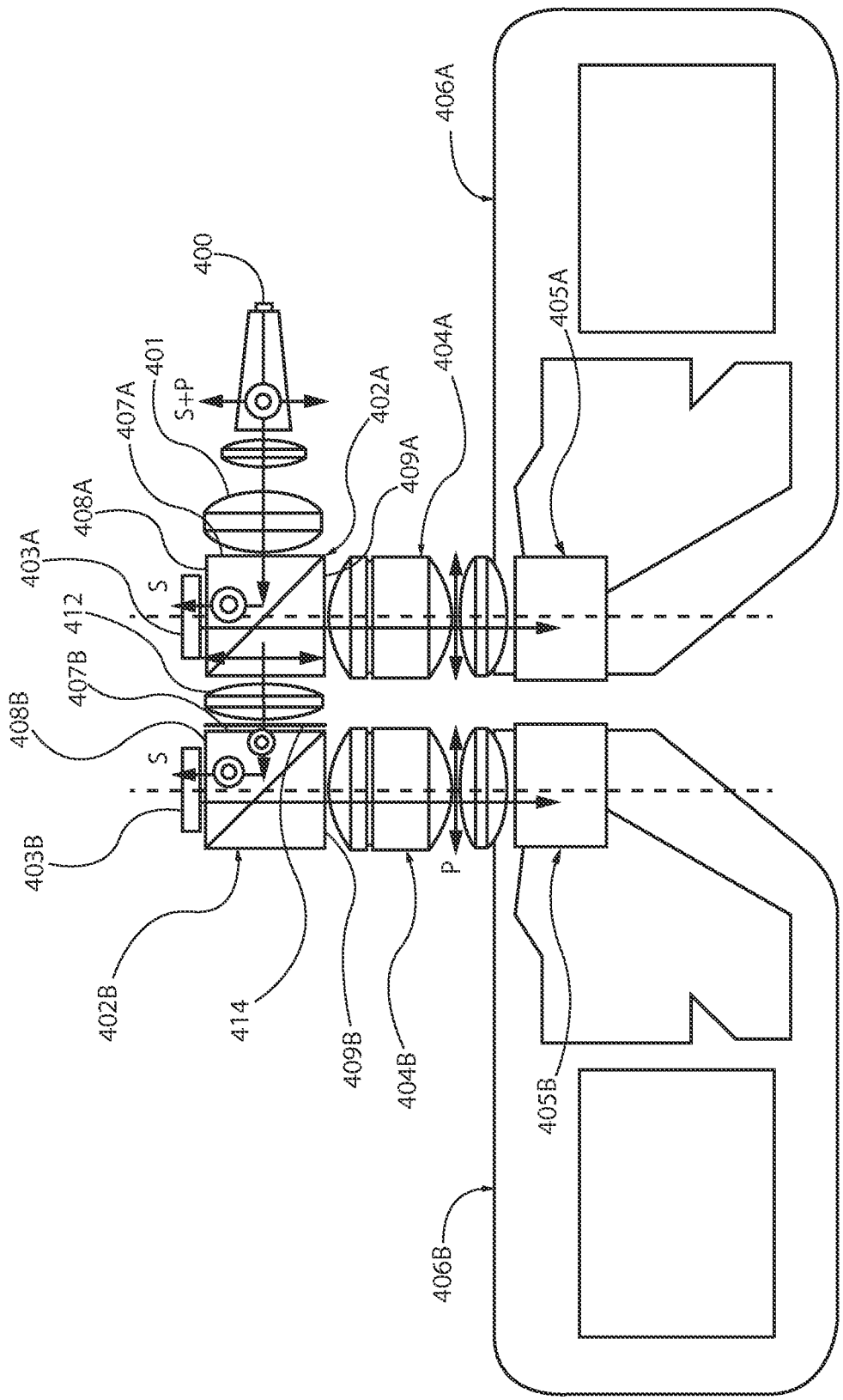

FIG. 4D is a diagram illustrating the paths and polarization of various light beams associated with a near eye display having a single light source according to at least one example embodiment. As can be seen, many of the components of the near eye display and surfaces of the polarizing beam splitters depicted in the example of FIG. 4D correspond with the components of the near eye display and surfaces of the polarizing beam splitters depicted in the examples of FIGS. 4A and 4B. As such, the various components of the example of FIG. 4D may be similar as described regarding the examples of FIGS. 4A and 4B. As can be seen in the example of FIG. 4D, light source 400 generates an input light beam that has both s-polarization components (indicated by an 'S' and the circle on the path of the light beam) and p-polarization components (indicated by the 'P' and the perpendicular arrow on the path of the light beam). The p- and s-polarized input light beam is directed through light source optical element 401 and light input surface 407A of polarizing beam splitter 402A. In the example of FIG. 4D, polarizing beam splitter 402A is configured to reflect light having an s-polarization, and to transmit light having a p-polarization. As can be seen, the input light beam is split into a first light beam having an s-polarization (indicated by an 'S' and the circle on the path of the first light beam directed towards display 403A) and a second light beam having a p-polarization (indicated by a 'P' and the perpendicular arrow on the path of the second light beam that is directed towards relay optical element 412, retarder 414, light input surface 407B, and/or the lie).

Following the path of the first light beam, the first light beam is reflected towards display 403A through display interface surface 408A. In the example of FIG. 4D, display 403A is configured to display information and selectively reflect a portion of the first light beam, changing the polarization of the reflected portion of the first light beam from an s-polarization to a p-polarization. Thus, the reflected portion of the first light beam having the p-polarization is transmitted through polarizing beam splitter 402A towards various components of the near eye display and light guide 406A.

Following the path of the second light beam, the second light beam having the p-polarization is directed towards retarded 414, which changes the polarization of the second light beam from p-polarization to s-polarization (indicated by the perpendicular arrow that indicates a p-polarization to the right of retarder 414 and a circle on the path of the second light beam to the left of retarder 414). As polarizing beam splitter 402B is configured to reflect light having an s-polarization, a substantial majority of the second light beam is reflected towards display 403B through display interface surface 408B. In the example of FIG. 4D, display 403B is configured to display information and selectively reflect a portion of the second light beam, changing the polarization of the reflected portion of the second light beam from an s-polarization to a p-polarization. Thus, the reflected portion of the second light beam having the p-polarization is transmitted through polarizing beam splitter 402B towards various components of the near eye display and light guide 406B.

Figure 5:
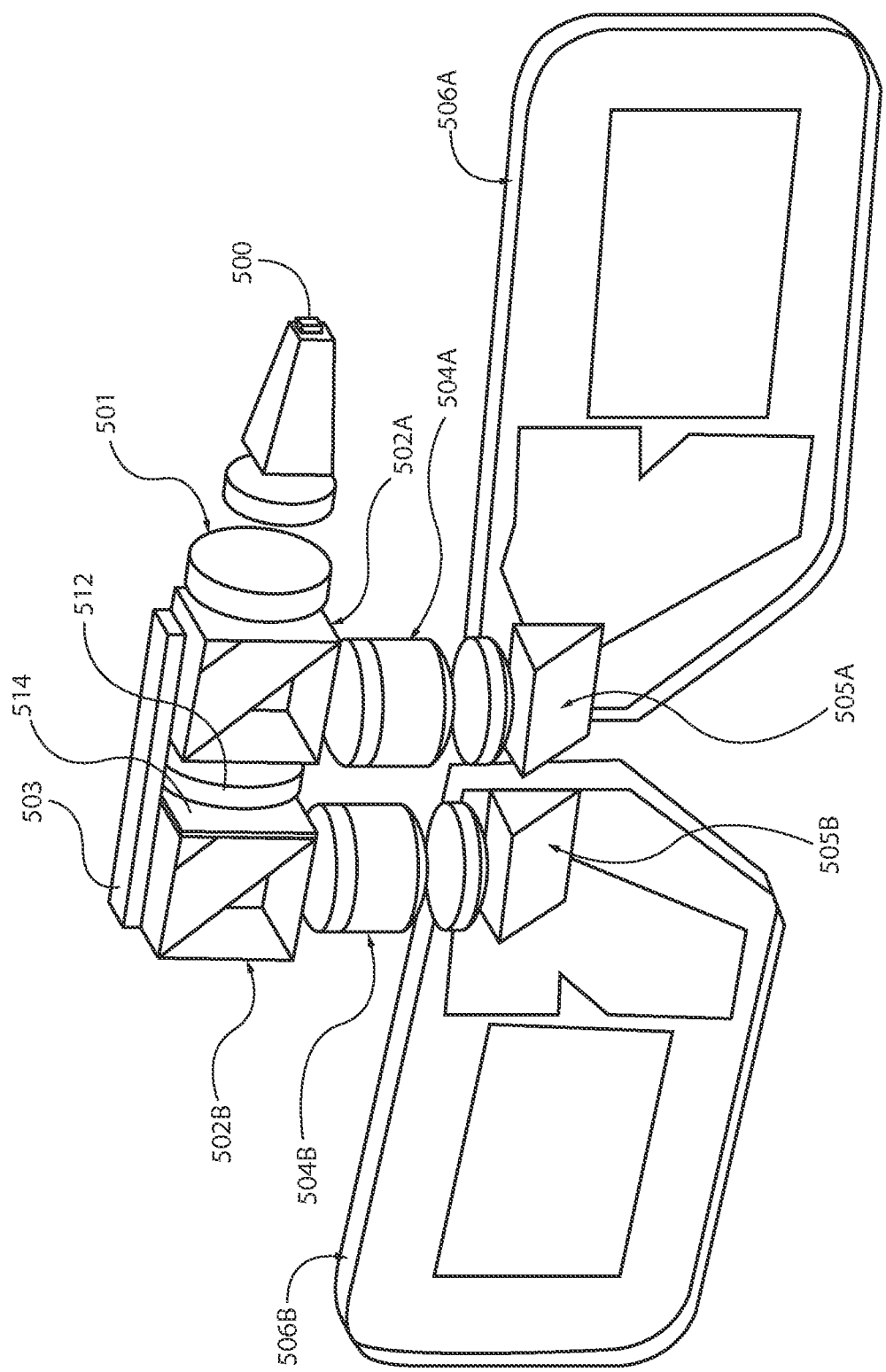
FIG. 5 is a diagram illustrating a near eye display according to at least one example embodiment.

FIG. 5 is a diagram illustrating a near eye display according to at least one example embodiment. The example of FIG. 5 is merely an example and does not limit the scope of the claims. For example, the configuration of the near eye display may vary, the configuration of the display may vary, the appearance of the near eye display may vary, and/or the like.

As stated previously, in many circumstances, a near eye display may be designed such that the near eye display is in a small form factor, unobtrusive, fashionable, etc. As such, it may be desirable to limit a number of electrical components comprised by the near eye display, to reduce the component count of components that draw a significant amount of power, and/or the like in order to reduce the power consumption of the near eye display, in order to reduce a cost of the components of the near eye display and/or assembly of the near eye display, and/or the like. For example, in some circumstances, utilization of a single larger display may be more desirable than utilization of two smaller displays. In such an example, the single larger display may be less expensive, may be easier to manufacture and/or assemble, may consume less power due to a lower display driver overhead, and/or the like. In at least one example embodiment, an apparatus comprises a first display and a second display. In such an example embodiment, the first display and the second display may be non-overlapping subparts of a single display. For example, the first display and the second display may be non-overlapping subparts of a single liquid crystal on silicon display, a single micromirror display, and/or the like.

FIG. 5 is a diagram illustrating a near eye display according to at least one example embodiment. The example of FIG. 5 depicts a near eye apparatus that comprises light source 500, light source optical element 501, polarizing beam splitters 502A and 502B, display 503, relay optical element 512, retarder 514, projection optical elements 504A and 504B, tilting prisms 505A and 505B, and light guides 506A and 506B. The light source, light source optical element, polarizing beam splitters, relay optical element, retarder, projection optical elements, tilting prisms, and light guides may be similar as described regarding the examples of FIGS. 3A-3C and FIGS. 4A-4D. As can be seen, display 503 spans across both polarizing beam splitters 502A and 502B. In this manner, the portion of display 503 that is coupled to polarizing beam splitter 502A may be referred to as a first display, and the portion of display 503 that is coupled to polarizing beam splitter 502B may be referred to as a second display. As such, the first display and the second display are non-overlapping portions of a single display, display 503.

Even though the examples of FIGS. 3A-3C, FIGS. 4A-4D, and FIG. 5 depict polarizing beam splitters as a dual triangle polarizing beam splitters, the near eye display may comprise any type of polarizing beam splitter.

Figure 6:
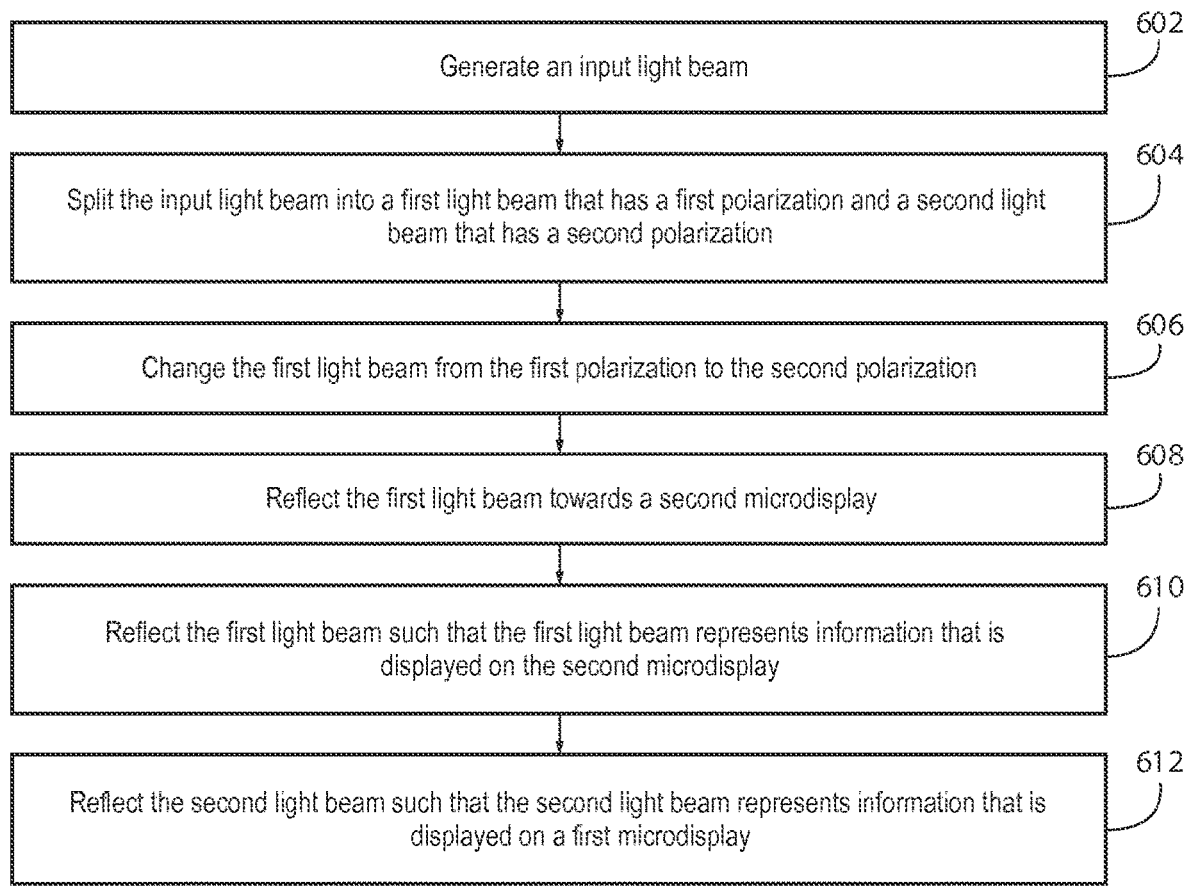
FIG. 6 is a flow diagram illustrating activities associated with reflection of a first light beam such that the first light beam represents information that is displayed on a second display and reflection of a second light beam such that the second light beam represents information that is displayed on a first display according to at least one example embodiment.

FIG. 6 is a flow diagram illustrating activities associated with reflection of a first light beam such that the first light beam represents information that is displayed on a second display and reflection of a second light beam such that the second light beam represents information that is displayed on a first display according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus generates an input light beam. In at least one example embodiment, the input light beam is generated by way of a light source. The generation, the input light beam, and the light source may be similar as described regarding FIGS. 3A-3C, FIGS. 4A-4D, and FIG. 5. For example, as shown in FIG. 4B, the apparatus may generate an input light beam by way of light source 400. The generated input light beam may be directed towards light input surface 407A of polarizing beam splitter 402A.

At block 604, the apparatus splits the input light beam into a first light beam that has a first polarization and a second light beam that has a second polarization. In at least one example embodiment, the input light beam is split by way of a first polarizing beam splitter. The splitting, the first light beam, the first polarization, the second light beam, the second polarization, and the first polarizing beam splitter may be similar as described regarding FIGS. 3A-3C, FIGS. 4A-4D, and FIG. 5. For example, as shown in FIG. 4B, the apparatus may split the input light beam into a first light beam that has a first polarization and a second light beam that has a second polarization by way of polarizing beam splitter 402A. In such an example, polarizing beam splitter 402A may reflect the second light beam through display interface surface 408A of polarizing beam splitter 402A towards display 403A, and may transmit the first light beam through light input transmission surface 410A of polarizing beam splitter 402A towards retarder 414.

At block 606, the apparatus changes the first light beam from the first polarization to the second polarization. In at least one example embodiment, the apparatus changes the first light beam from the first polarization to the second polarization by way of a retarder. The changing of the polarization and the retarder may be similar as described regarding FIGS. 4A-4D and FIG. 5. For example, as shown in FIG. 4B, the apparatus may change the first light beam from the first polarization to the second polarization by way of retarder 414. In such an example, retarder 414 may receive the first light beam having the first polarization, and transmit the first light beam having the second polarization towards light input surface 407B of polarizing beam splitter 402B.

At block 608, the apparatus reflects the first light beam towards a second display. In at least one example embodiment, the first light beam is reflected by way of a second polarizing beam splitter. The reflection of the first light beam, the second display, and the second polarizing beam splitter may be similar as described regarding FIGS. 4A-4D and FIG. 5. For example, as shown in FIG. 4B, the apparatus may reflect the first light beam through display interface surface 408B of polarizing beam splitter 402B towards display 403B by way of polarizing beam splitter 402B.

At block 610, the apparatus reflects the first light beam such that the first light beam represents information that is displayed on the second display. In at least one example embodiment, the first light beam is reflected by way of the second display. The reflection of the first light beam and the information that is displayed on the second display may be similar as described regarding FIGS. 3A-3C, FIGS. 4A-4D, and FIG. 5. For example, as shown in FIG. 4B, the apparatus may reflect the first light beam by way of display 403B such that the first light beam represents information that is displayed on display 403B. The reflected first light beam may be directed through display interface surface 408B and display projection surface 409B of polarizing beam splitter 402B towards light guide 406B.

At block 612, the apparatus reflects the second light beam such that the second light beam represents information that is displayed on a first display. In at least one example embodiment, the second light beam is reflected by way of the first display. The reflection of the second light beam and the information that is displayed on the first display may be similar as described regarding FIGS. 3A-3C, FIGS. 4A-4D, and FIG. 5. For example, as shown in FIG. 4B, the apparatus may reflect the second light beam by way of display 403A such that the second light beam represents information that is displayed on display 403A. The reflected second light beam may be directed through display interface surface 408A and display projection surface 409A of polarizing beam splitter 402A towards light guide 406A.

Figure 7:
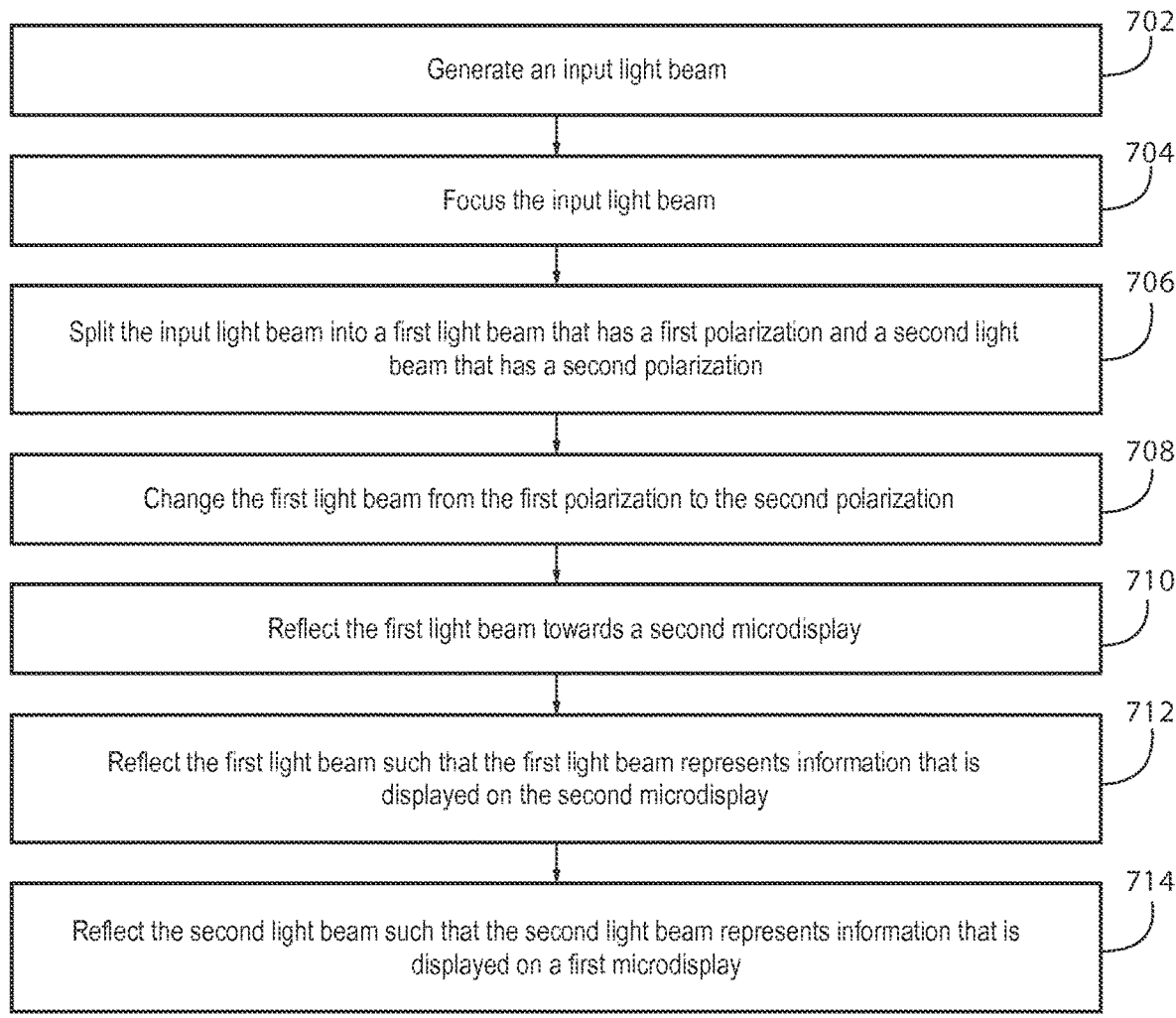
FIG. 7 is a flow diagram illustrating activities associated with focusing of an input light beam according to at least one example embodiment.

FIG. 7 is a flow diagram illustrating activities associated with focusing of an input light beam according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As previously described, in some circumstances, it may be desirable to focus, manipulate, change, etc. the input light beam. For example, it may be desirable to focus the input light beam prior to splitting of the input light beam into a first light beam that has a first polarization and a second light beam that has a second polarization.

At block 702, the apparatus generates an input light beam. In at least one example embodiment, the input light beam is generated by way of a light source. The generation, the input light beam, and the light source may be similar as described regarding FIGS. 3A-3C, FIGS. 4A-4D, and FIG. 5. For example, as shown in FIG. 4B, the apparatus may generate an input light beam by way of light source 400. The generated input light beam may be directed towards light input surface 407A of polarizing beam splitter 402A.

At block 704, the apparatus focuses the input light beam. In at least one example embodiment, the apparatus focuses the input light beam by way of at least one light source optical element. In at least one example embodiment, the focusing of the input light beam comprises directing the input light beam towards the at least one light source optical element. The focusing of the input light beam and the at least one light source optical element may be similar as described regarding FIGS. 3A-3C, FIGS. 4A-4D, and FIG. 5. For example, as shown in FIG. 4B, the apparatus may focus the input light beam by way of light source optical element 401. In this manner, light source optical element 401 may receive the input light beam from light source 400 and transmit a focused, aligned, filtered, reoriented, shaped, etc. input light beam towards light input surface 407A of polarizing beam splitter 402A.

At block 706, the apparatus splits the input light beam into a first light beam that has a first polarization and a second light beam that has a second polarization. In at least one example embodiment, the input light beam is split by way of a first polarizing beam splitter. The splitting, the first light beam, the first polarization, the second light beam, the second polarization, and the first polarizing beam splitter may be similar as described regarding FIGS. 3A-3C, FIGS. 4A-4D, and FIG. 5. For example, as shown in FIG. 4B, the apparatus may split the input light beam into a first light beam that has a first polarization and a second light beam that has a second polarization by way of polarizing beam splitter 402A. In such an example, polarizing beam splitter 402A may reflect the second light beam through display interface surface 408A of polarizing beam splitter 402A towards display 403A, and may transmit the first light beam through light input transmission surface 410A of polarizing beam splitter 402A towards retarder 414.

At block 708, the apparatus changes the first light beam from the first polarization to the second polarization. In at least one example embodiment, the apparatus changes the first light beam from the first polarization to the second polarization by way of a retarder. The changing of the polarization and the retarder may be similar as described regarding FIGS. 4A-4D and FIG. 5. For example, as shown in FIG. 4B, the apparatus may change the first light beam from the first polarization to the second polarization by way of retarder 414. In such an example, retarder 414 may receive the first light beam having the first polarization, and transmit the first light beam having the second polarization towards light input surface 407B of polarizing beam splitter 402B.

At block 710, the apparatus reflects the first light beam towards a second display. In at least one example embodiment, the first light beam is reflected by way of a second polarizing beam splitter. The reflection of the first light beam, the second display, and the second polarizing beam splitter may be similar as described regarding FIGS. 4A-4D and FIG. 5. For example, as shown in FIG. 4B, the apparatus may reflect the first light beam through display interface surface 408B of polarizing beam splitter 402B towards display 403B by way of polarizing beam splitter 402B.

At block 712, the apparatus reflects the first light beam such that the first light beam represents information that is displayed on the second display. In at least one example embodiment, the first light beam is reflected by way of the second display. The reflection of the first light beam and the information that is displayed on the second display may be similar as described regarding FIGS. 3A-3C, FIGS. 4A-4D, and FIG. 5. For example, as shown in FIG. 4B, the apparatus may reflect the first light beam by way of display 403B such that the first light beam represents information that is displayed on display 403B. The reflected first light beam may be directed through display interface surface 408B and display projection surface 409B of polarizing beam splitter 402B towards light guide 406B.

At block 714, the apparatus reflects the second light beam such that the second light beam represents information that is displayed on a first display. In at least one example embodiment, the second light beam is reflected by way of the first display. The reflection of the second light beam and the information that is displayed on the first display may be similar as described regarding FIGS. 3A-3C, FIGS. 4A-4D, and FIG. 5. For example, as shown in FIG. 4B, the apparatus may reflect the second light beam by way of display 403A such that the second light beam represents information that is displayed on display 403A. The reflected second light beam may be directed through display interface surface 408A and display projection surface 409A of polarizing beam splitter 402A towards light guide 406A.

Figure 8:
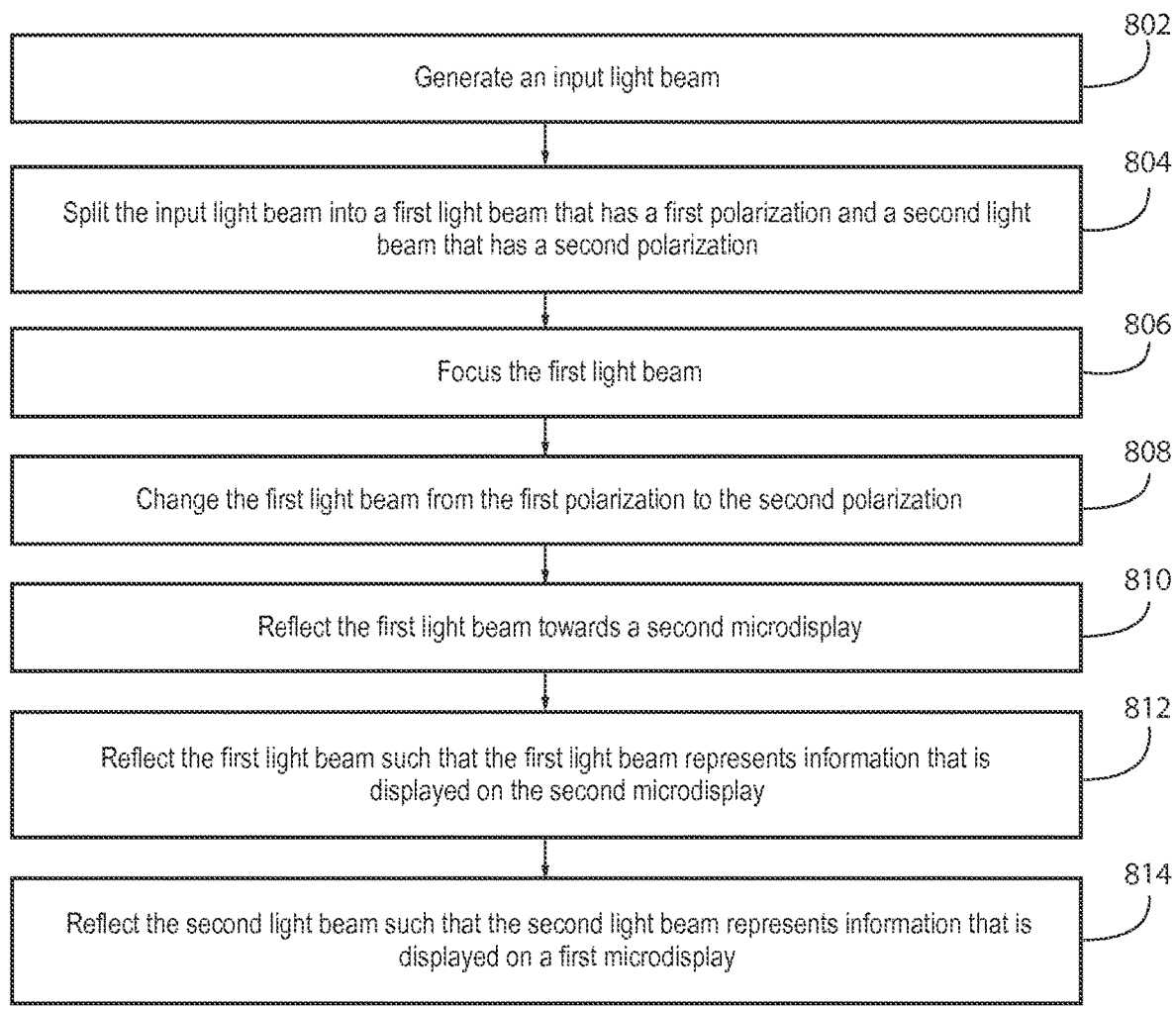
FIG. 8 is a flow diagram illustrating activities associated with focusing of a first light beam according to at least one example embodiment.

FIG. 8 is a flow diagram illustrating activities associated with focusing of a first light beam according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in some circumstances, it may be desirable to focus, manipulate, change, etc. the first light beam. For example, it may be desirable to focus the first light beam prior to changing of the first light beam from the first polarization to the second polarization.

At block 802, the apparatus generates an input light beam. In at least one example embodiment, the input light beam is generated by way of a light source. The generation, the input light beam, and the light source may be similar as described regarding FIGS. 3A-3C, FIGS. 4A-4D, and FIG. 5. For example, as shown in FIG. 4B, the apparatus may generate an input light beam by way of light source 400. The generated input light beam may be directed towards light input surface 407A of polarizing beam splitter 402A.

At block 804, the apparatus splits the input light beam into a first light beam that has a first polarization and a second light beam that has a second polarization. In at least one example embodiment, the input light beam is split by way of a first polarizing beam splitter. The splitting, the first light beam, the first polarization, the second light beam, the second polarization, and the first polarizing beam splitter may be similar as described regarding FIGS. 3A-3C, FIGS. 4A-4D, and FIG. 5. For example, as shown in FIG. 4B, the apparatus may split the input light beam into a first light beam that has a first polarization and a second light beam that has a second polarization by way of polarizing beam splitter 402A. In such an example, polarizing beam splitter 402A may reflect the second light beam through display interface surface 408A of polarizing beam splitter 402A towards display 403A, and may transmit the first light beam through light input transmission surface 410A of polarizing beam splitter 402A towards retarder 414.

At block 806, the apparatus focuses the first light beam. In at least one example embodiment, the apparatus focuses the first light beam by way of at least one relay optical element. In at least one example embodiment, the focusing of the first light beam comprises directing the first light beam towards the at least one relay optical element. The focusing of the first light beam and the at least one relay optical element may be similar as described regarding FIGS. 4A-4D and FIG. 5. For example, as shown in FIG. 4B, the apparatus may focus the first light beam by way of relay optical element 412. In this manner, relay optical element 412 may receive the first light beam from light input transmission surface 410A of polarizing beam splitter 402A and transmit a focused, aligned, filtered, reoriented, shaped, etc. first light beam towards retarder 414.

At block 808, the apparatus changes the first light beam from the first polarization to the second polarization. In at least one example embodiment, the apparatus changes the first light beam from the first polarization to the second polarization by way of a retarder. The changing of the polarization and the retarder may be similar as described regarding FIGS. 4A-4D and FIG. 5. For example, as shown in FIG. 4B, the apparatus may change the first light beam from the first polarization to the second polarization by way of retarder 414. In such an example, retarder 414 may receive the first light beam having the first polarization, and transmit the first light beam having the second polarization towards light input surface 407B of polarizing beam splitter 402B.

At block 810, the apparatus reflects the first light beam towards a second display. In at least one example embodiment, the first light beam is reflected by way of a second polarizing beam splitter. The reflection of the first light beam, the second display, and the second polarizing beam splitter may be similar as described regarding FIGS. 4A-4D and FIG. 5. For example, as shown in FIG. 4B, the apparatus may reflect the first light beam through display interface surface 408B of polarizing beam splitter 402B towards display 403B by way of polarizing beam splitter 402B.

At block 812, the apparatus reflects the first light beam such that the first light beam represents information that is displayed on the second display. In at least one example embodiment, the first light beam is reflected by way of the second display. The reflection of the first light beam and the information that is displayed on the second display may be similar as described regarding FIGS. 3A-3C, FIGS. 4A-4D, and FIG. 5. For example, as shown in FIG. 4B, the apparatus may reflect the first light beam by way of display 403B such that the first light beam represents information that is displayed on display 403B. The reflected first light beam may be directed through display interface surface 408B and display projection surface 409B of polarizing beam splitter 402B towards light guide 406B.

At block 814, the apparatus reflects the second light beam such that the second light beam represents information that is displayed on a first display. In at least one example embodiment, the second light beam is reflected by way of the first display. The reflection of the second light beam and the information that is displayed on the first display may be similar as described regarding FIGS. 3A-3C, FIGS. 4A-4D, and FIG. 5. For example, as shown in FIG. 4B, the apparatus may reflect the second light beam by way of display 403A such that the second light beam represents information that is displayed on display 403A. The reflected second light beam may be directed through display interface surface 408A and display projection surface 409A of polarizing beam splitter 402A towards light guide 406A.

Figure 9:
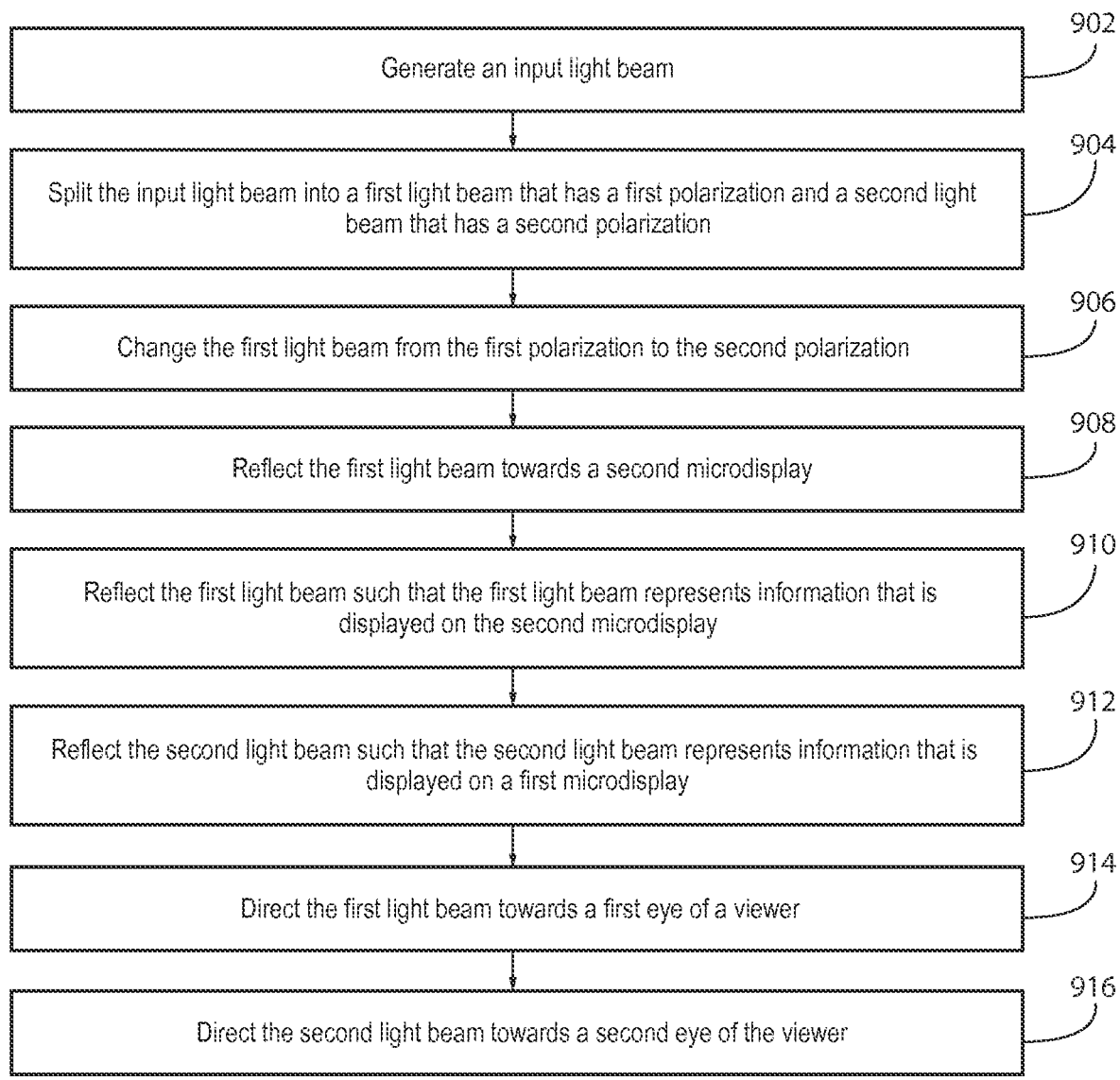
FIG. 9 is a flow diagram illustrating activities associated with directing of a first light beam towards a first eye of a viewer and directing of a second light beam towards a second eye of the viewer according to at least one example embodiment.

FIG. 9 is a flow diagram illustrating activities associated with directing of a first light beam towards a first eye of a viewer and directing of a second light beam towards a second eye of the viewer according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As previously described, in some circumstances, it may be desirable to direct a light beam towards an eye of a viewer.

At block 902, the apparatus generates an input light beam. In at least one example embodiment, the input light beam is generated by way of a light source. The generation, the input light beam, and the light source may be similar as described regarding FIGS. 3A-3C, FIGS. 4A-4D, and FIG. 5. For example, as shown in FIG. 4B, the apparatus may generate an input light beam by way of light source 400. The generated input light beam may be directed towards light input surface 407A of polarizing beam splitter 402A.

At block 904, the apparatus splits the input light beam into a first light beam that has a first polarization and a second light beam that has a second polarization. In at least one example embodiment, the input light beam is split by way of a first polarizing beam splitter. The splitting, the first light beam, the first polarization, the second light beam, the second polarization, and the first polarizing beam splitter may be similar as described regarding FIGS. 3A-3C, FIGS. 4A-4D, and FIG. 5. For example, as shown in FIG. 4B, the apparatus may split the input light beam into a first light beam that has a first polarization and a second light beam that has a second polarization by way of polarizing beam splitter 402A. In such an example, polarizing beam splitter 402A may reflect the second light beam through display interface surface 408A of polarizing beam splitter 402A towards display 403A, and may transmit the first light beam through light input transmission surface 410A of polarizing beam splitter 402A towards retarder 414.

At block 906, the apparatus changes the first light beam from the first polarization to the second polarization. In at least one example embodiment, the apparatus changes the first light beam from the first polarization to the second polarization by way of a retarder. The changing of the polarization and the retarder may be similar as described regarding FIGS. 4A-4D and FIG. 5. For example, as shown in FIG. 4B, the apparatus may change the first light beam from the first polarization to the second polarization by way of retarder 414. In such an example, retarder 414 may receive the first light beam having the first polarization, and transmit the first light beam having the second polarization towards light input surface 407B of polarizing beam splitter 402B.

At block 908, the apparatus reflects the first light beam towards a second display. In at least one example embodiment, the first light beam is reflected by way of a second polarizing beam splitter. The reflection of the first light beam, the second display, and the second polarizing beam splitter may be similar as described regarding FIGS. 4A-4D and FIG. 5. For example, as shown in FIG. 4B, the apparatus may reflect the first light beam through display interface surface 408B of polarizing beam splitter 402B towards display 403B by way of polarizing beam splitter 402B.

At block 910, the apparatus reflects the first light beam such that the first light beam represents information that is displayed on the second display. In at least one example embodiment, the first light beam is reflected by way of the second display. The reflection of the first light beam and the information that is displayed on the second display may be similar as described regarding FIGS. 3A-3C, FIGS. 4A-4D, and FIG. 5. For example, as shown in FIG. 4B, the apparatus may reflect the first light beam by way of display 403B such that the first light beam represents information that is displayed on display 403B. The reflected first light beam may be directed through display interface surface 408B and display projection surface 409B of polarizing beam splitter 402B towards light guide 406B.

At block 912, the apparatus reflects the second light beam such that the second light beam represents information that is displayed on a first display. In at least one example embodiment, the second light beam is reflected by way of the first display. The reflection of the second light beam and the information that is displayed on the first display may be similar as described regarding FIGS. 3A-3C, FIGS. 4A-4D, and FIG. 5. For example, as shown in FIG. 4B, the apparatus may reflect the second light beam by way of display 403A such that the second light beam represents information that is displayed on display 403A. The reflected second light beam may be directed through display interface surface 408A and display projection surface 409A of polarizing beam splitter 402A towards light guide 406A.

At block 914, the apparatus directs the first light beam towards a first eye of a viewer. In at least one example embodiment, the first light beam is directed towards the first eye of the viewer by way of a first light guide. The directing of the first light beam, the first eye, the viewer, and the first light guide may be similar as described regarding FIGS. 3A-3C, FIGS. 4A-4D, and FIG. 5. For example, as shown in FIG. 4B, the apparatus may direct the first light beam towards a first eye of a viewer by way of light guide 406B.

At block 916, the apparatus directs the second light beam towards a second eye of the viewer. In at least one example embodiment, the second light beam is directed towards the second eye of the viewer by way of a second light guide. The directing of the second light beam, the second eye of the viewer, and the second light guide may be similar as described regarding FIGS. 3A-3C, FIGS. 4A-4D, and FIG. 5. For example, as shown in FIG. 4B, the apparatus may direct the second light beam towards a second eye of the viewer by way of light guide 406A.

One or more example embodiments may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various computer-readable media.

If desired, the different functions discussed herein may be performed in a different order and/or concurrently with each other. For example, block 612 of FIG. 6 may be performed after block 604 of FIG. 6. Furthermore, if desired, one or more of the above-described functions may be optional or may be combined. For example, block 704 of FIG. 7 may be optional and/or combined with block 702 of FIG. 7.

Although various aspects of the present subject matter are set out in the independent claims, other aspects of the present subject matter comprise other combinations of features from the described example embodiments and/or the dependent claims with the features of the independent claims, and not solely the combinations explicitly set out in the claims.

It is also noted herein that while the above describes example embodiments, these descriptions should not be viewed in a limiting sense. Rather, there are variations and modifications which may be made without departing from the scope of the present subject matter.

The invention claimed is:

1. An apparatus comprising:
a light source, the light source providing light having a first polarization and light having a second polarization;
a first display;
a first polarizing beam splitter having:
a first light input surface oriented to receive light of the first polarization and light of the second polarization from the light source,
a first light input transmission surface oriented to transmit light received at the first light input surface and having the first polarization,
a first display interface surface oriented to transmit light received at the first light input surface and having a second polarization to the first display mounted on the first display interface surface and to receive light having the first polarization from the first display, the first display changing the second polarization to the first polarization, and
a first display projection surface oriented to transmit the light having the first polarization received at the first display interface surface;
a lambda-over-two retarder, the lambda-over-two retarder being positioned to receive light having the first polarization from the first light input transmission surface, the lambda-over-two retarder being provided to change the first polarization to the second polarization;
a second display; and
a second polarizing beam splitter having:
a second light input surface oriented to receive light having the second polarization from the lambda-over-two retarder,
a second display interface surface oriented to transmit light received at the second light input surface and having the second polarization to the second display mounted on the second display interface surface and to receive light having the first polarization from the second display, the second display changing the second polarization to the first polarization, and
a second display projection surface oriented to transmit the light having the first polarization received at the second display interface surface.

2. The apparatus of claim 1, further comprising:
at least one light source optical element positioned between the light source and the first light input surface.

3. The apparatus of claim 1, further comprising:
at least one relay optical element positioned between the first light input transmission surface and the second light input surface.

4. The apparatus of claim 1, wherein the first polarization is p-polarization and the second polarization is s-polarization.

5. The apparatus of claim 1, wherein the first display is separate from the second display.

6. The apparatus of claim 1, wherein the first display and the second display are non-overlapping subparts of a single display.

7. The apparatus of claim 1, further comprising:
a first light guide oriented to receive light from the first display projection surface; and
a second light guide oriented to receive light from the second display projection surface.

8. The apparatus of claim 7, the first light guide being a first exit pupil expander light guide, and the second light guide being a second exit pupil expander light guide.

9. A method comprising:
generating an input light beam;
splitting the input light beam into a first light beam having a first polarization and a second light beam having a second polarization;
changing the first light beam from the first polarization to the second polarization;
reflecting the first light beam towards a second display;
receiving the first light beam from the second display changed to the first polarization such that the first light beam represents information displayed on the second display;
reflecting the second light beam towards a first display; and
receiving the second light beam from the first display changed to the first polarization such that the second light beam represents information displayed on a first display,
wherein the information displayed on the first display is transmitted through a first display projection surface in the first polarization and the information displayed on the second display is transmitted through a second display projection surface in the first polarization.

10. The method of claim 9, wherein the splitting of the input light beam comprises:
reflecting the second light beam, by way of the first polarizing beam splitter, towards the first display; and
transmitting the first light beam by way of the first polarization beam splitter.

* * * * *

UNITED STATES PATENT AND TRADEMARK OFFICE
CERTIFICATE OF CORRECTION

PATENT NO. : 10,768,422 B2
APPLICATION NO. : 15/748706
DATED : September 8, 2020
INVENTOR(S) : Jarvenpaa et al.

Page 1 of 1

It is certified that error appears in the above-identified patent and that said Letters Patent is hereby corrected as shown below:

In the Claims

In Claim 9:
Column 30, Line 33, "light beam" should be deleted and --light beam with a light source providing light having a first polarization and light having a second polarization-- should be inserted.
Column 30, Lines 35-36, "a first polarization and a second light beam having a second polarization" should be deleted and --the first polarization and a second light beam having the second polarization with a first polarizing beam splitter-- should be inserted.
Column 30, Line 38, "polarization" should be deleted and --polarization with a lambda-over-two retarder-- should be inserted.
Column 30, Line 39, "display" should be deleted and --display with a second polarizing beam splitter-- should be inserted.
Column 30, Line 44, "display" should be deleted and --display with the first polarizing beam splitter-- should be inserted.
Column 30, Line 51, "surface" should be deleted and --surface of the first polarizing beam splitter-- should be inserted.
Column 30, Line 54, "surface" should be deleted and --surface of the second polarizing beam splitter-- should be inserted.

Signed and Sealed this
Seventeenth Day of November, 2020

Andrei Iancu
*Director of the United States Patent and Trademark Office*